United States Patent
Teyeb et al.

(10) Patent No.: US 12,483,944 B2
(45) Date of Patent: Nov. 25, 2025

(54) F1 SETUP DURING IAB HANDOVER

(71) Applicant: Telefonaktiebolaget LM Ericsson (PUBL), Stockholm (SE)

(72) Inventors: Oumer Teyeb, Montréal (CA); Filip Barac, Huddinge (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 363 days.

(21) Appl. No.: 18/002,356

(22) PCT Filed: Jun. 25, 2021

(86) PCT No.: PCT/EP2021/067501
§ 371 (c)(1),
(2) Date: Dec. 19, 2022

(87) PCT Pub. No.: WO2021/260184
PCT Pub. Date: Dec. 30, 2021

(65) Prior Publication Data
US 2023/0239755 A1    Jul. 27, 2023

Related U.S. Application Data

(60) Provisional application No. 63/044,043, filed on Jun. 25, 2020.

(51) Int. Cl.
*H04W 36/00* (2009.01)
*H04W 36/08* (2009.01)

(52) U.S. Cl.
CPC ...... *H04W 36/0064* (2023.05); *H04W 36/087* (2023.05)

(58) Field of Classification Search
CPC . H04W 40/24; H04W 36/08; H04W 36/0055; H04W 36/0064; H04W 36/087; H04W 76/22; H04W 84/047; H04W 88/085; H04W 36/083; H04W 36/085; H04W 36/13
See application file for complete search history.

(56) References Cited

FOREIGN PATENT DOCUMENTS

WO  WO-2019246446 A1 * 12/2019 ........ H04W 36/0055
WO      2020039346 A1     2/2020

OTHER PUBLICATIONS

3GPP TR 38.874 V16.0.0; 3rd Generation Partnership Project; Technical Specification Group Radio Access Network; NR; Study on Integrated Access and Backhaul; (Release 16)—Dec. 2018.
3GPP TS 38.401 V16.2.0; 3rd Generation Partnership Project; Technical Specification Group Radio Access Network; NG-RAN; Architecture description (Release 16)—Jul. 2020.
(Continued)

*Primary Examiner* — Ji-Hae Yea
(74) *Attorney, Agent, or Firm* — Baker Botts L.L.P.

(57) ABSTRACT

According to some embodiments, a network node is capable of operating as an integrated access and backhaul (IAB) node comprising a distributed unit (DU) and a mobile termination (MT). The IAB node performs a method comprising; obtaining configuration information for establishing an interface between the IAB node DU and a target IAB donor central unit (CU); and after a handover of the IAB node to the target donor, establishing the interface between the IAB node DU and the target IAB donor CU based on the obtained configuration information.

8 Claims, 28 Drawing Sheets

2000

2012 – obtain configuration information for establishing an interface between a IAB node DU and a target IAB donor CU 2014 – after a handover of the IAB node to the target donor, establish the interface between the IAB node DU and the target IAB donor CU based on the obtained configuration information

(56) References Cited

OTHER PUBLICATIONS

3GPP TS 38.423 V16.2.0; 3rd Generation Partnership Project; Technical Specification Group Radio Access Network; NG-RAN; Xn application protocol (XnAP) (Release 16)—Jul. 2020.
3GPP TS 38.473 V16.2.0; 3rd Generation Partnership Project; Technical Specification Group Radio Access Network; NG-RAN; F1 application protocol (F1AP) (Release 16)—Jul. 2020.
PCT Notification of Transmittal of the International Search Report and the Written Opinion of the International Searching Authority, or the Declaration issued for International application No. PCT/EP2021/067501—Oct. 6, 2021.
3GPP TSG-RAN WG3 Meeting #102; Spokane, WA, USA; Source: Qualcomm Inc., Nokia, Samsung; Title: IAB inter-CU Topology Adaptation for Arch 1a (R3-186456)—Nov. 12-16, 2018.
3GPP TSG RAN WG3 Meeting #106; Reno, USA; Title: Discussion on inter-CU IAB migration handling; Source: ZTE, Sanechips (R3-196689)—Nov. 18-22, 2019.

\* cited by examiner

F1 SETUP DURING IAB HANDOVER

PRIORITY

This nonprovisional application is a U.S. National Stage Filing under 35 U.S.C. § 371 of International Patent Application Serial No. PCT/EP2021/067501 filed Jun. 25, 2021 and entitled "Improved F1 Setup During IAB Handover" which claims priority to U.S. Provisional Patent Application No. 63/044,043 filed Jun. 25, 2020 both of which are hereby incorporated by reference in their entirety.

TECHNICAL FIELD

Embodiments of the present disclosure are directed to wireless communications and, more particularly, to improved F1 setup for handover in integrated access and backhaul (IAB) networks.

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

Third Generation Partnership Project (3GPP) wireless network specifications include integrated access and wireless backhaul (IAB) for fifth generation (5G) new radio (NR) networks. Usage of short range mmWave spectrum in NR creates a need for densified deployment with multi-hop backhauling. However, optical fiber to every base station is too costly and sometimes not possible (e.g., historical sites). The main IAB principle is the use of wireless links for the backhaul (instead of fiber) to enable flexible and dense deployment of cells without the need for densifying the transport network.

Use case scenarios for IAB can include coverage extension, deployment of massive number of small cells, and fixed wireless access (FWA) (e.g., to residential/office buildings). The larger bandwidth available for NR in mmWave spectrum provides opportunity for self-backhauling without limiting the spectrum available for the access links. In addition, the inherent multi-beam and multiple input multiple output (MIMO) support in NR reduces cross-link interference between backhaul and access links facilitating higher densification.

The IAB architecture (see TR 38.874) may leverage the central unit (CU)/distributed unit (DU) split architecture of NR, where the IAB node hosts a DU part that is controlled by a central unit. The IAB nodes also have a mobile termination (MT) part used to communicate with their parent nodes.

The IAB specifications may reuse other existing functions and interfaces defined in NR. In particular, IAB may reuse MT, gNB-DU, gNB-CU, user plane function (UPF), access and mobility management function (AMF), and session management function (SMF), as well as the corresponding interfaces NR Uu (between MT and gNB), F1, NG, X2 and N4 that are used as baseline for the IAB architecture. Modifications or enhancements to these functions and interfaces for the support of IAB are explained in the context of the architecture discussion. Additional functionality such as multi-hop forwarding is included in the architecture discussion because it is beneficial for the understanding of IAB operation.

The mobile-termination (MT) function is a component of the IAB node. As used herein, MT refers to a function residing on an IAB-node that terminates the radio interface layers of the backhaul Uu interface toward the IAB-donor or other IAB-nodes.

FIG. 1 illustrates a reference diagram for IAB in standalone mode, which includes one IAB-donor and multiple IAB-nodes. The IAB-donor is treated as a single logical node that comprises a set of functions such as gNB-DU, gNB-CU-CP, gNB-CU-UP and potentially other functions. In a deployment, the IAB-donor may be split according to these functions, which can all be either collocated or non-collocated as allowed by 3GPP NG-RAN architecture. IAB-related aspects may arise when such split is exercised. Also, some of the functions presently associated with the IAB-donor may be moved outside of the donor if it becomes evident that they do not perform IAB-specific tasks.

The baseline user plane and control plane protocol stacks for IAB are illustrated in FIGS. 2 and 3, respectively. As illustrated in FIGS. 2 and 3, the chosen protocol stacks reuse the current CU-DU split specification, where the full user plane F1-U (GTP-U/UDP/IP) is terminated at the IAB node (like a normal DU) and the full control plane F1-C (F1-AP/SCTP/IP) is also terminated at the IAB node (like a normal DU). In the above cases, Network Domain Security (NDS) has been employed to protect both UP and CP traffic (IPsec in the case of UP, and Datagram Transport Layer Security (DTLS) in the case of CP). IPsec may also be used for the CP protection instead of DTLS (in this case no DTLS layer is used).

The IAB nodes and IAB donor include the Backhaul Adaptation Protocol (BAP), which is used for routing of packets to the appropriate downstream/upstream node and also mapping the user equipment (UE) bearer data to the proper backhaul radio link control (RLC) channel (and also between ingress and egress backhaul RLC channels in intermediate IAB nodes) to satisfy the end to end QoS requirements of bearers.

On the IAB-node, the BAP sublayer contains one BAP entity at the MT function and a separate collocated BAP entity at the DU function. On the IAB-donor-DU, the BAP sublayer contains only one BAP entity. Each BAP entity has a transmitting part and a receiving part. The transmitting part of the BAP entity has a corresponding receiving part of a BAP entity at the IAB-node or IAB-donor-DU across the backhaul link.

FIG. 4 illustrates an example functional view of the BAP sublayer. The functional view should not restrict implementation. FIG. 4 is based on the radio interface protocol architecture defined in TS 38.300. In FIG. 4, the receiving part on the BAP entity delivers BAP protocol data units (PDUs) to the transmitting part on the collocated BAP entity. Alternatively, the receiving part may deliver BAP service data units (SDUs) to the collocated transmitting part. When passing BAP SDUs, the receiving part removes the BAP header and the transmitting part adds the BAP header with the same BAP routing ID as carried on the BAP PDU header prior to removal. Passing BAP SDUs in this manner is therefore functionally equivalent to passing BAP PDUs, in implementation.

The BAP sublayer provides data transfer services to upper layers. The BAP sublayer expects the following services from lower layers per RLC entity (for a detailed description see TS 38.322): acknowledged data transfer service and unacknowledged data transfer service.

The BAP sublayer supports the following functions: data transfer; determination of BAP destination and path for packets from upper layers; determination of egress backhaul RLC channels for packets routed to next hop; routing of packets to next hop; differentiating traffic to be delivered to upper layers from traffic to be delivered to egress link; and flow control feedback and polling signaling.

FIG. 5 illustrates an example of possible IAB-node migration cases listed in the order of complexity. FIG. 5 illustrates four migration cases, labelled case (A), case (B), case (C), and case (D).

Intra-CU Case (A): In this case the IAB-node (e) along with its serving UEs is moved to a new parent node (IAB-node (b)) under the same donor-DU (1). The successful intra-donor DU migration requires establishing UE context setup for the IAB-node (e) MT in the DU of the new parent node (IAB-node (b)), updating routing tables of IAB nodes along the path to IAB-node (e) and allocating resources on the new path. The IP address for IAB-node (e) will not change, while the F1-U tunnel/connection between donor-CU (1) and IAB-node (e) DU will be redirected through IAB-node (b).

Intra-CU Case (B): The procedural requirements/complexity of this case is the same as that of Case (A). Also, because the new IAB-donor DU (i.e., DU2) is connected to the same L2 network, the IAB-node (e) can use the same IP address under the new donor DU. However, the new donor DU (i.e., DU2) will need to inform the network using IAB-node (e) L2 address to get/keep the same IP address for IAB-node (e) by employing some mechanism such as Address Resolution Protocol (ARP).

Intra-CU Case (C): This case is more complex than Case (A) because it also needs allocation of new IP address for IAB-node (e). If IPsec is used for securing the F1-U tunnel/connection between the Donor-CU (1) and IAB-node (e) DU, then it may be possible to use existing IP address along the path segment between the Donor-CU (1) and SeGW, and new IP address for the IPsec tunnel between SeGW and IAB-node (e) DU.

Inter-CU Case (D): This is the most complex case in terms of procedural requirements and may need new specification procedures that are beyond the scope of 3GPP Rel-16.

Note that 3GPP Rel-16 has standardized procedure only for intra-CU migration, which is described below.

The following describes the intra-CU topology adaptation procedure. During the intra-CU topology adaptation, both the source and the target parent node are served by the same IAB-donor-CU. The target parent node may use a different IAB-donor-DU than the source parent node. The source path may further have common nodes with the target path.

FIG. 6 illustrates an example topology adaptation procedure, where the target parent node uses a different IAB-donor-DU than the source parent node. At step 1, the migrating IAB-MT sends a Measurement Report message to the source parent node gNB-DU. The report is based on a Measurement Configuration the migrating IAB-MT received from the IAB-donor-CU before.

At step 2, the source parent node gNB-DU sends an UL RRC MESSAGE TRANSFER message to the IAB-donor-CU to convey the received Measurement Report.

At step 3, the IAB-donor-CU sends a UE CONTEXT SETUP REQUEST message to the target parent node gNB-DU to create the UE context for the migrating IAB-MT and setup one or more bearers. These bearers are used by the migrating IAB-MT for its own data and signaling traffic.

At step 4, the target parent node gNB-DU responds to the IAB-donor-CU with a UE CONTEXT SETUP RESPONSE message.

At step 5, the IAB-donor-CU sends a UE CONTEXT MODIFICATION REQUEST message to the source parent node gNB-DU, which includes a generated RRCReconfiguration message. The Transmission Action Indicator in the UE CONTEXT MODIFICATION REQUEST message indicates to stop the data transmission to the migrating IAB-node.

At step 5, the source parent node gNB-DU forwards the received RRCReconfiguration message to the migrating IAB-MT.

At step 7, the source parent node gNB-DU responds to the IAB-donor-CU with the UE CONTEXT MODIFICATION RESPONSE message.

At step 8, a Random Access procedure is performed at the target parent node gNB-DU.

At step 9, the migrating IAB-MT responds to the target parent node gNB-DU with an RRCReconfigurationComplete message.

At step 10, he target parent node gNB-DU sends an UL RRC MESSAGE TRANSFER message to the IAB-donor-CU to convey the received RRCReconfigurationComplete message. Also, uplink packets can be sent from the migrating IAB-MT, which are forwarded to the IAB-donor-CU through the target parent node gNB-DU. These DL and UL packets belong to the MT's own signaling and data traffic.

At step 11, the IAB-donor-CU configures BH RLC channels and BAP-layer route entries on the target path between migrating IAB-node and target IAB-donor-DU. This step also includes allocation of TNL address(es) that is (are) routable via the target IAB-donor-DU. These configurations may be performed at an earlier stage, e.g., after step 3. The new TNL address(es) is (are) included in the RRCReconfiguration message at step 5.

At step 12, all F1-U tunnels and F1-C are switched to use the migrating IAB-node's new TNL address(es).

At step 13, the IAB-donor-CU sends a UE CONTEXT RELEASE COMMAND message to the source parent node gNB-DU.

At step 14, the source parent node gNB-DU releases the migrating IAB-MT's context and responds the IAB-donor-CU with a UE CONTEXT RELEASE COMPLETE message.

At step 15, the IAB-donor-CU releases BH RLC channels and BAP routing entries on the source path. The migrating IAB-node may further release the TNL address(es) it used on the source path.

If the source route and target route have common nodes, the BH RLC channels and BAP routing entries of those nodes may not need to be released in step 15.

Steps 11, 12 and 15 are also performed for the migrating IAB-node's descendant nodes, as follows. The descendant nodes switch to new TNL addresses that are anchored in the target IAB-donor-DU. The IAB-donor-CU may send these addresses to the descendant nodes and release the old addresses via corresponding radio resource control (RRC) signaling.

If needed, the IAB-donor-CU configures BH RLC channels, BAP-layer route entries on the target path for the descendant nodes and the BH RLC channel mappings on the descendant nodes in the same manner as described for the migrating IAB-node in step 11.

The descendant nodes switch their F1-U and F1-C tunnels to new TNL addresses that are anchored at the new IAB-donor-DU, in the same manner as described for the migrating IAB-node in step 12.

Based on implementation, these steps can be performed after or in parallel with the handover of the migrating IAB-node. In Rel-16, in-flight packets in UL direction that were dropped during the migration procedure may not be recoverable.

In the upstream direction, in-flight packets between the source parent node and the IAB-donor-CU can be delivered even after the target path is established. On-going downlink data in the source path may be discarded. It is up to implementation. The IAB-donor-CU can determine the unsuccessfully transmitted downlink data over the backhaul link by implementation.

F1 signaling and procedures are described in TS 38.472 and 38.473, and summarized as follows. The F1-C signalling bearer provides the following functions: provision of reliable transfer of F1AP messages over the F1-C interface, provision of networking and routing function, provision of redundancy in the signaling network, and support for flow control and congestion control.

FIG. 7 illustrates the F1-C Signalling Bearer protocol stack. Details on each protocol are described below.

The Transport Network Layer is based on IP transport, comprising SCTP on top of IP. The support of any suitable Data Link Layer protocol, e.g. PPP, Ethernet, etc., shall not be prevented.

The gNB-CU and gNB-DU shall support IPv6 (IETF RFC 8200) and/or IPv4 (IETF RFC 791). The IP layer of F1-C only supports point-to-point transmission for delivering F1AP message. The gNB-CU and gNB-DU shall support the Diffsery Code Point marking as described in IETF RFC 2474.

SCTP (IETF RFC 4960) shall be supported as the transport layer of F1-C signalling bearer. The Payload Protocol Identifier (ppid) assigned by IANA to be used by SCTP for the application layer protocol F1AP is 62, and 68 for DTLS over SCTP (IETF RFC 6083). The byte order of the ppid shall be big-endian.

SCTP refers to the Stream Control Transmission Protocol developed by the Sigtran working group of the IETF for the purpose of transporting various signalling protocols over IP network.

The gNB-DU and gNB-CU shall support a configuration with a single SCTP association per gNB-DU/gNB-CU pair. Configurations with multiple SCTP endpoints per gNB-DU/gNB-CU pair should be supported. When configurations with multiple SCTP associations are supported, the gNB-CU/gNB-DU may request to dynamically add/remove SCTP associations between the gNB-DU/gNB-CU pair.

The gNB-DU shall establish the SCTP association. The SCTP Destination Port number value assigned by IANA to be used for F1AP is 38472. When the gNB-CU requests to dynamically add additional SCTP associations between the gNB-DU/gNB-CU pair, the SCTP Destination Port number value may be 38472, or any dynamic port value (IETF RFC 6335).

Within the set of SCTP associations established between one gNB-CU and gNB-DU pair, a single SCTP association shall be employed for F1AP elementary procedures that utilize non-UE-associated signalling with the possibility of fail-over to a new association to enable robustness. Selection of the SCTP association by the gNB-DU and the gNB-CU is specified in TS 38.401.

When the configuration with multiple SCTP endpoints per gNB-DU is supported and the gNB-DU wants to add additional SCTP endpoints, the gNB-DU Configuration Update procedure shall be the first F1AP procedure triggered on an additional TNLA of an already setup F1-C interface instance after the TNL association has become operational, and the gNB-CU shall associate the TNLA to the F1-C interface instance using the included gNB-DU ID.

Between one gNB-CU and gNB-DU pair, a single pair of stream identifiers shall be reserved over an SCTP association for the sole use of F1AP elementary procedures that utilize non UE-associated signaling. At least one pair of stream identifiers over one or several SCTP associations shall be reserved for the sole use of F1AP elementary procedures that utilize UE-associated signaling. However, a few pairs (i.e., more than one) should be reserved. For a single UE-associated signaling, the gNB-DU shall use one SCTP association and one SCTP stream, and the association/stream should not be changed during the communication of the UE-associated signaling unless TNL binding update is performed.

Transport network redundancy may be achieved by SCTP multi-homing between two end-points, of which one or both is assigned with multiple IP addresses. SCTP end-points shall support a multi-homed remote SCTP end-point. For SCTP endpoint redundancy an INIT may be sent from a gNB-CU or gNB-DU, at any time for an already established SCTP association, which shall be handled as defined in IETF RFC 4960 in sub clause 5.2.

The SCTP congestion control may, using an implementation specific mechanism, initiate higher layer protocols to reduce the signalling traffic at the source and prioritise certain messages.

The purpose of the F1 Setup procedure is to exchange application level data needed for the gNB-DU and the gNB-CU to correctly interoperate on the F1 interface. This procedure shall be the first F1AP procedure triggered for the F1-C interface instance after a TNL association has become operational.

If F1-C signaling transport is shared among multiple F1-C interface instances, one F1 Setup procedure is issued per F1-C interface instance to be setup, i.e., several F1 Setup procedures may be issued via the same TNL association after that TNL association has become operational.

The procedure uses non-UE associated signalling. The procedure erases any existing application level configuration data in the two nodes and replaces it by the one received. The procedure also re-initialises the F1AP UE-related contexts (if any) and erases all related signalling connections in the two nodes like a Reset procedure would do.

FIG. 8 is a flow diagram illustrating a successful F1 setup procedure. In a successful operation, the gNB-DU initiates the procedure by sending a F1 SETUP REQUEST message including the appropriate data to the gNB-CU. The gNB-CU responds with a F1 SETUP RESPONSE message including the appropriate data.

The exchanged data shall be stored in respective node and used as long as there is an operational TNL association. When the procedure is finished, the F1 interface is operational and other F1 messages may be exchanged.

If the F1 SETUP REQUEST message contains the gNB-DU Name IE, the gNB-CU may use this IE as a human readable name of the gNB-DU.

If the F1 SETUP REQUEST message contains the gNB-DU Served Cells List IE, the gNB-CU shall take into account as specified in TS 38.401.

For NG-RAN, the gNB-DU shall include the gNB-DU System Information IE and the TAI Slice Support List IE in the F1 SETUP REQUEST message.

The gNB-CU may include the Cells to be Activated List IE in the F1 SETUP RESPONSE message. The Cells to be Activated List IE includes a list of cells that the gNB-CU requests the gNB-DU to activate. The gNB-DU shall activate the cells included in the Cells to be Activated List IE and reconfigure the physical cell identity for cells for which the NR PCI IE is included.

For NG-RAN, the gNB-CU shall include the gNB-CU System Information IE in the F1 SETUP RESPONSE message.

For NG-RAN, the gNB-DU may include the RAN Area Code IE in the F1 SETUP REQUEST message. The gNB-CU may use it according to TS 38.300.

For NG-RAN, the gNB-CU may include Available PLMN List IE, and optionally also Extended Available PLMN List IE in the F1 SETUP RESPONSE message, if the available PLMN(s) are different from what gNB-DU has provided in F1 SETUP REQUEST message, gNB-DU shall take this into account and only broadcast the PLMN(s) included in the received Available PLMN list(s).

The Latest RRC Version Enhanced IE shall be included in the F1 SETUP REQUEST message and in the F1 SETUP RESPONSE message.

If in F1 SETUP REQUEST message, the Cell Direction IE is present, the gNB-CU should use it to understand whether the cell is for UL or DL only. If in F1 SETUP REQUEST message, the Cell Direction IE is omitted in the Served Cell Information IE it shall be interpreted as that the Cell Direction is Bi-directional.

If the Intended TDD DL-UL Configuration IE is present in the F1 SETUP REQUEST message, the receiving gNB-CU shall use the received information for Cross Link Interference management. The gNB-CU may merge the Intended TDD DL-UL Configuration information received from two or more gNB-DUs. The gNB-CU shall consider the received Neighbour Cell Information List IE content valid until reception of an update of the IE for the same cell(s).

If the Aggressor gNB Set ID IE is included in the Served Cell Information IE in the F1 SETUP REQUEST message, the gNB-CU shall, if supported, take it into account.

If the Victim gNB Set ID IE is included in the Served Cell Information IE in the F1 SETUP REQUEST message, the gNB-CU shall, if supported, take it into account.

If the F1 SETUP REQUEST message contains the Transport Layer Address Info IE, the gNB-CU shall, if supported, take into account for IPSec tunnel establishment.

If the F1 SETUP RESPONSE message contains the Transport Layer Address Info IE, the gNB-DU shall, if supported, take into account for IPSec tunnel establishment.

FIG. 9 is a flow diagram illustrating an unsuccessful F1 setup procedure. In an unsuccessful operation, for example, if the gNB-CU cannot accept the setup, it should respond with a F1 SETUP FAILURE and appropriate cause value. If the F1 SETUP FAILURE message includes the Time To Wait IE, the gNB-DU shall wait at least for the indicated time before reinitiating the F1 setup towards the same gNB-CU.

The F1 SETUP REQUEST message is sent by the gNB-DU to transfer information associated to an F1-C interface instance. If a TNL association is shared among several F1-C interface instances, several F1 Setup procedures are issued via the same TNL association after that TNL association has become operational.

The F1 Setup Request include the following fields.

| IE/GroupName | Presence | Range | IE type and reference | Semantics description | Criticality | Assigned Criticality |
|---|---|---|---|---|---|---|
| Message Type | M | | 9.3.1.1 | | YES | reject |
| Transaction ID | M | | 9.3.1.23 | | YES | reject |
| gNB-DU ID | M | | 9.3.1.9 | | YES | reject |
| gNB-DU Name | O | | Printable String (SIZE(1 . . . 150, . . . )) | | YES | ignore |
| gNB-DU Served Cells List | | 0 . . . 1 | | List of cells configured in the gNB-DU | YES | reject |
| >gNB-DU Served Cells Item | | 1 . . . <maxCellingNBDU> | | | EACH | reject |
| >>Served Cell Information | M | | 9.3.1.10 | Information about the cells configured in the gNB-DU | — | |
| >>gNB-DU System Information | O | | 9.3.1.18 | RRC container with system information owned by gNB-DU | — | |
| gNB-DU RRC version | M | | RRC version 9.3.1.70 | | YES | reject |
| Transport Layer Address Info | O | | 9.3.2.5 | | YES | ignore |

| Range bound | Explanation |
|---|---|
| maxCellingNBDU | Maximum no. cells that can be served by a gNB-DU. Value is 512. |

The F1 SETUP RESPONSE message is sent by the gNB-CU to transfer information associated to an F1-C interface instance.

| IE/Group Name | Presence | Range | IE type and reference | Semantics description | Criticality | Assigned Criticality |
|---|---|---|---|---|---|---|
| Message Type | M | | 9.3.1.1 | | YES | reject |
| Transaction ID | M | | 9.3.1.23 | | YES | reject |
| gNB-CU Name | O | | Printable String (SIZE(1 ... 150, ... )) | Human readable name of the gNB-CU. | YES | ignore |
| Cells to be Activated List | | 0 ... 1 | | | YES | reject |
| >Cells to be Activated List Item | | 1 ... <maxCellingNBDU> | | List of cells to be activated | EACH | reject |
| >> NR CGI | M | | 9.3.1.12 | | — | |
| >> NR PCI | O | | INTEGER (0 ... 1007) | Physical Cell ID | — | |
| >>gNB-Cu System Information | O | | 9.3.1.42 | RRC container with system information owned by gNB-CU | YES | reject |
| >>Available PLMN List | O | | 9.3.1.65 | | YES | ignore |
| >>Extended Available PLMN List | O | | 9.3.1.76 | This is included if Available PLMN List IE is included and if more than 6 Available PLMNs is to be signaled. | YES | ignore |
| gNB-CU RRC version | M | | RRC version 9.3.1.70 | | YES | reject |
| Transport Layer Address Info | O | | 9.3.2.5 | | YES | ignore |

| Range bound | Explanation |
|---|---|
| maxCellingNBDU | Maximum no. cells that can be served by a gNB-DU. Value is 512. |

The F1 SETUP FAILURE message is sent by the gNB-CU to indicate F1 Setup failure.

| IE/Group Name | Presence | Range | IE type and reference | Semantics description | Criticality | Assigned Criticality |
|---|---|---|---|---|---|---|
| Message Type | M | | 9.3.1.1 | | YES | reject |
| Transaction ID | M | | 9.3.1.23 | | YES | reject |
| Cause | M | | 9.3.1.2 | | YES | ignore |
| Time to wait | O | | 9.3.1.13 | | YES | ignore |
| Criticality Diagnostics | O | | 9.3.1.3 | | YES | ignore |

The F1 Removal procedure is described as follows. The purpose of the F1 Removal procedure is to remove the interface instance and all related resources between the gNB-DU and the gNB-CU in a controlled manner. If successful, this procedure erases any existing application level configuration data in the two nodes.

If the signaling transport is shared among several F1-C interface instances, and the TNL association is still used by one or several F1-C interface instances, the initiating node should not initiate the removal of the TNL association. The procedure uses non-UE-associated signaling. Examples are illustrated in FIGS. 10-13.

FIG. 10 is a flow diagram illustrating gNB-DU initiated successful F1 removal. FIG. 11 is a flow diagram illustrating gNB-CU initiated successful F1 removal.

In a successful gNB-DU initiated F1 removal, the gNB-DU initiates the procedure by sending the F1 REMOVAL REQUEST message to the gNB-CU. Upon reception of the F1 REMOVAL REQUEST message the gNB-CU shall reply with the F1 REMOVAL RESPONSE message. After receiving the F1 REMOVAL RESPONSE message, the gNB-DU may initiate removal of the TNL association towards the gNB-CU, if applicable, and may remove all resources associated with that signaling connection. The gNB-CU may then remove all resources associated with that interface instance.

In a successful gNB-CU initiated F1 removal, the gNB-CU initiates the procedure by sending the F1 REMOVAL REQUEST message to the gNB-DU. Upon reception of the F1 REMOVAL REQUEST message the gNB-DU shall reply with the F1 REMOVAL RESPONSE message. After receiving the F1 REMOVAL RESPONSE message, the gNB-CU may initiate removal of the TNL association towards the gNB-DU, if applicable, and may remove all resources associated with that signaling connection. The gNB-DU may then remove all resources associated with that interface instance.

FIG. 12 is a flow diagram illustrating gNB-DU initiated unsuccessful F1 removal. FIG. 13 is a flow diagram illustrating gNB-CU initiated unsuccessful F1 removal.

In an unsuccessful gNB-DU initiated F1 removal, if the gNB-CU cannot accept to remove the signaling connection with the gNB-DU, it shall respond with an F1 REMOVAL FAILURE message with an appropriate cause value.

In an unsuccessful gNB-CU initiated F1 removal, if the gNB-DU cannot accept to remove the signaling connection with the gNB-CU, it shall respond with an F1 REMOVAL FAILURE message with an appropriate cause value.

The F1 REMOVAL REQUEST message is sent by either the gNB-DU or the gNB-CU to initiate the removal of the interface instance and the related resources.

| IE/Group Name | Presence | Range | IE type and reference | Semantics description | Criticality | Assigned Criticality |
|---|---|---|---|---|---|---|
| Message Type | M | | 9.3.1.1 | | YES | reject |
| Transaction ID | M | | 9.3.1.23 | | YES | reject |

The F1 REMOVAL RESPONSE message is sent by either the gNB-DU or the gNB-CU to acknowledge the initiation of removal of the interface instance and the related resources.

| IE/Group Name | Presence | Range | IE type and reference | Semantics description | Criticality | Assigned Criticality |
|---|---|---|---|---|---|---|
| Message Type | M | | 9.3.1.1 | | YES | reject |
| Transaction ID | M | | 9.3.1.23 | | YES | reject |
| Criticality Diagnostics | O | | 9.3.1.3 | | YES | ignore |

The F1 REMOVAL FAILURE message is sent by either the gNB-DU or the gNB-CU to indicate that removing the interface instance and the related resources cannot be accepted.

| IE/Group Name | Presence | Range | IE type and reference | Semantics description | Criticality | Assigned Criticality |
|---|---|---|---|---|---|---|
| Message Type | M | | 9.2.3.1 | | YES | reject |
| Transaction ID | M | | 9.3.1.23 | | YES | reject |
| Cause | M | | 9.3.1.2 | | YES | ignore |
| Criticality Diagnostics | O | | 9.3.1.3 | | YES | ignore |

There currently exist certain challenges. For example, as described above 3GPP has standardized only IAB intra-CU migration procedure. Considering that inter-CU migration is an important feature of IAB, enhancements to existing UE handover and IAB intra-CU migration procedure are required for reducing service interruption (due to IAB-node migration) and signaling load. It is also anticipated that mobile IAB nodes will be standardized in future releases of 3GPP.

One problem that needs to be solved when an IAB node is handed over from one donor CU to another donor CU is the relocation/setup of the F1 connection between the IAB node and the new CU. In a legacy (i.e., non-IAB) CU/DU split architecture, the F1 setup is triggered by the DU, where the DU has been configured (usually via OAM) with the required information needed for the setup procedure (such as the IP address, i.e. transport address, of the CU). However, currently there is no procedure for relocating an F1 connection of a DU from one CU to another, which is required when an IAB node performs inter-CU relocation

SUMMARY

As described above, certain challenges currently exist with inter-control unit (inter-CU) migration for integrated access and backhaul (IAB) node relocation. Certain aspects of the present disclosure and their embodiments may provide solutions to these or other challenges. For example, particular embodiments include CU-triggered/initiated F1 setup/relocation in an IAB network. Some embodiments include relocating the F1 connection of an IAB node from one donor CU to another during an inter-CU IAB migration.

In a particular embodiment, the DU of the migrating IAB node is provided with information about the target CU (e.g., transport layer information) during the handover of the IAB-mobile termination (IAB-MT) and uses that information to initiate the F1-Setup procedure with the target.

In a particular embodiment, the source donor CU provides the target donor CU with information about the distributed unit (DU) of the migrating IAB node (e.g., served cells, transport layer addresses, etc.), and the target donor CU uses the information to respond with the F1-setup response message to the DU of the IAB node, after the IAB-MT is handed over to it.

In a particular embodiment, the source donor CU provides the target donor CU with information about the DU of the migrating IAB node and the target donor CU uses the information to initiate the F1-setup procedure with the DU of the IAB node, after the IAB-MT is handed over to it.

According to some embodiments, a network node is capable of operating as an IAB node comprising a DU and a MT. The IAB node performs a method comprising: obtaining configuration information for establishing an interface between the IAB node DU and a target IAB donor CU; and after a handover of the IAB node to the target donor, establishing the interface between the IAB node DU and the target IAB donor CU based on the obtained configuration information.

In particular embodiments, obtaining configuration information comprises receiving the configuration information from a source IAB donor CU. Receiving the configuration information from a source IAB donor CU may comprise receiving a F1 message at the IAB node DU or receiving the configuration information from a source IAB donor CU comprises receiving a radio resource control (RRC) message at the IAB node MT. In some embodiments, obtaining configuration information comprises receiving a handover command that includes the configuration information.

In particular embodiments, the configuration information comprises a list of IAB donor CUs and associated configuration information for each IAB donor CU in the list of IAB donor CUs:

In particular embodiments, the interface comprises an F1 interface and the configuration information comprises a transport layer address of the target IAB donor CU.

In particular embodiments, establishing the interface between the IAB node DU and the target IAB donor CU is triggered based on an indication from the target IAB donor CU.

According to some embodiments, a network node is capable of operating as an IAB donor. The IAB donor performs a method comprising determining to handover a IAB node to a target IAB donor. The IAB node comprises a DU and a MT and the target IAB donor comprises a CU. The method further comprises transmitting a handover request to the target IAB donor and receiving, from the target IAB donor, configuration information for establishing an interface between the IAB node DU and the target IAB donor CU. The method may include transmitting the configuration information to the IAB node.

In particular embodiments, transmitting the configuration information to the IAB node comprises transmitting a handover command that includes the configuration information to the IAB node MT, transmitting a F1 message to the IAB node DU, or transmitting a RRC message to the IAB node MT.

In particular embodiments, the interface comprises an F1 interface and the configuration information comprises a transport layer address of the target IAB donor CU.

According to some embodiments, a network node is capable of operating as an IAB donor. The IAB donor performs a method comprising receiving a handover request for an IAB node from a source IAB donor. The handover request comprises configuration information for establishing an interface between the IAB node DU and the IAB donor CU. The method further comprises, after a handover of the IAB node to the IAB donor, establishing the interface between the IAB node DU and the IAB donor CU based on the received configuration information.

In particular embodiments, the interface comprises an F1 interface and the configuration information comprises a transport layer address of the IAB node.

In particular embodiments, establishing the interface comprises sending a setup request to the IAB node or sending an indication to the IAB node for the IAB node to establish the interface.

In particular embodiments, the configuration information comprises an interface context for an interface between the IAB node DU and the source IAB donor CU, and establishing the interface comprises sending a setup response to the IAB node. The setup response is based on the received interface context.

According to some embodiments, a network node comprises processing circuitry operable to perform any of the network node methods described above.

Also disclosed is a computer program product comprising a non-transitory computer readable medium storing computer readable program code, the computer readable program code operable, when executed by processing circuitry to perform any of the methods performed by the network nodes described above.

Certain embodiments may provide one or more of the following technical advantages. For example, particular embodiments facilitate a faster F1 connection setup during IAB handover, thereby reducing the overall handover time and improving the performance of all the UEs that are directly or indirectly being served by the migrating IAB node (e.g., UEs directly connected to the IAB node, UEs connected to the children of the IAB node, etc.).

BRIEF DESCRIPTION OF THE DRAWINGS

For a more complete understanding of the disclosed embodiments and their features and advantages, reference is now made to the following description, taken in conjunction with the accompanying drawings, in which.

DETAILED DESCRIPTION

Figure 1:
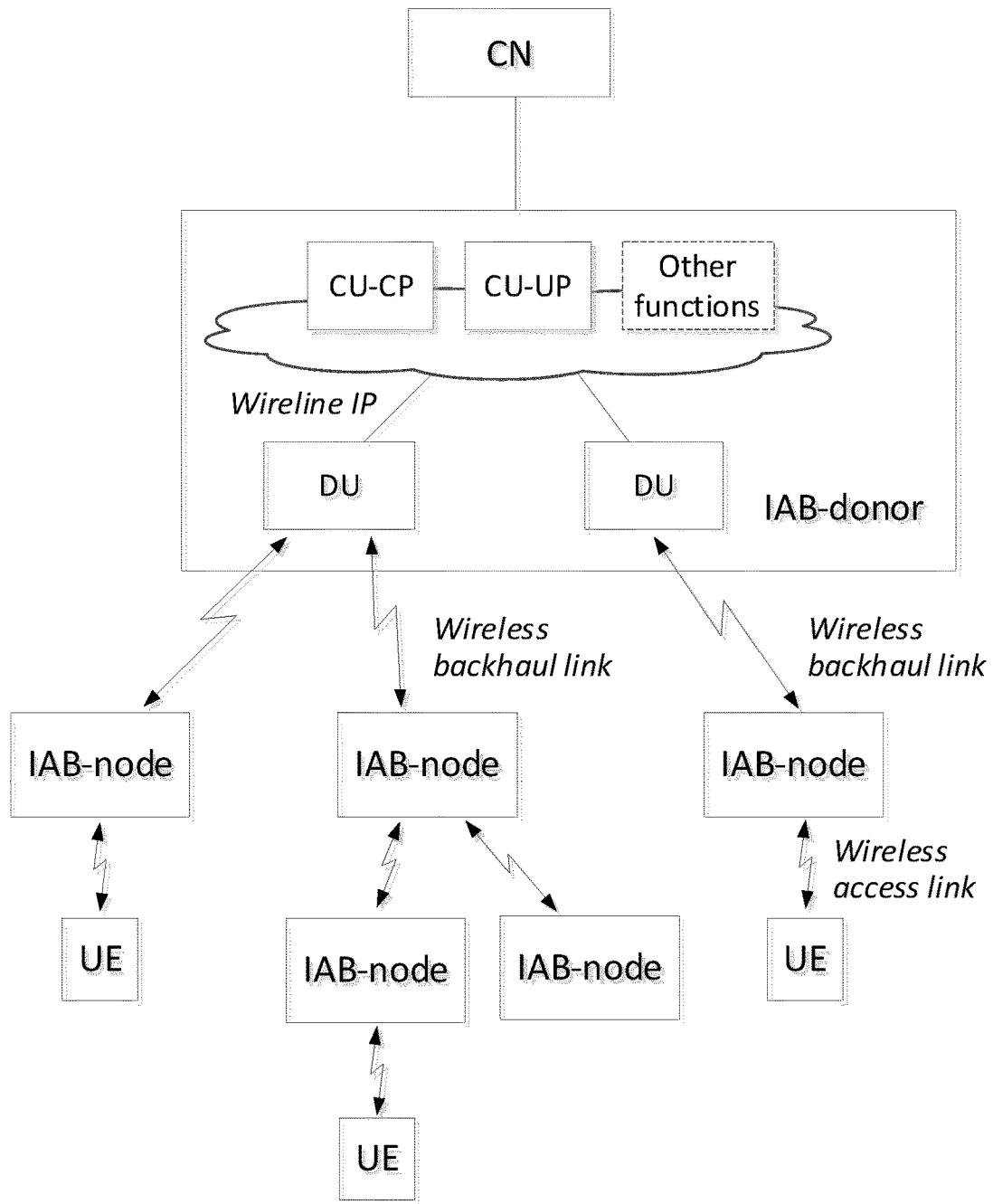
FIG. 1 illustrates a reference diagram for IAB in stand-alone mode, which includes one IAB-donor and multiple IAB-nodes.
Figure 2:
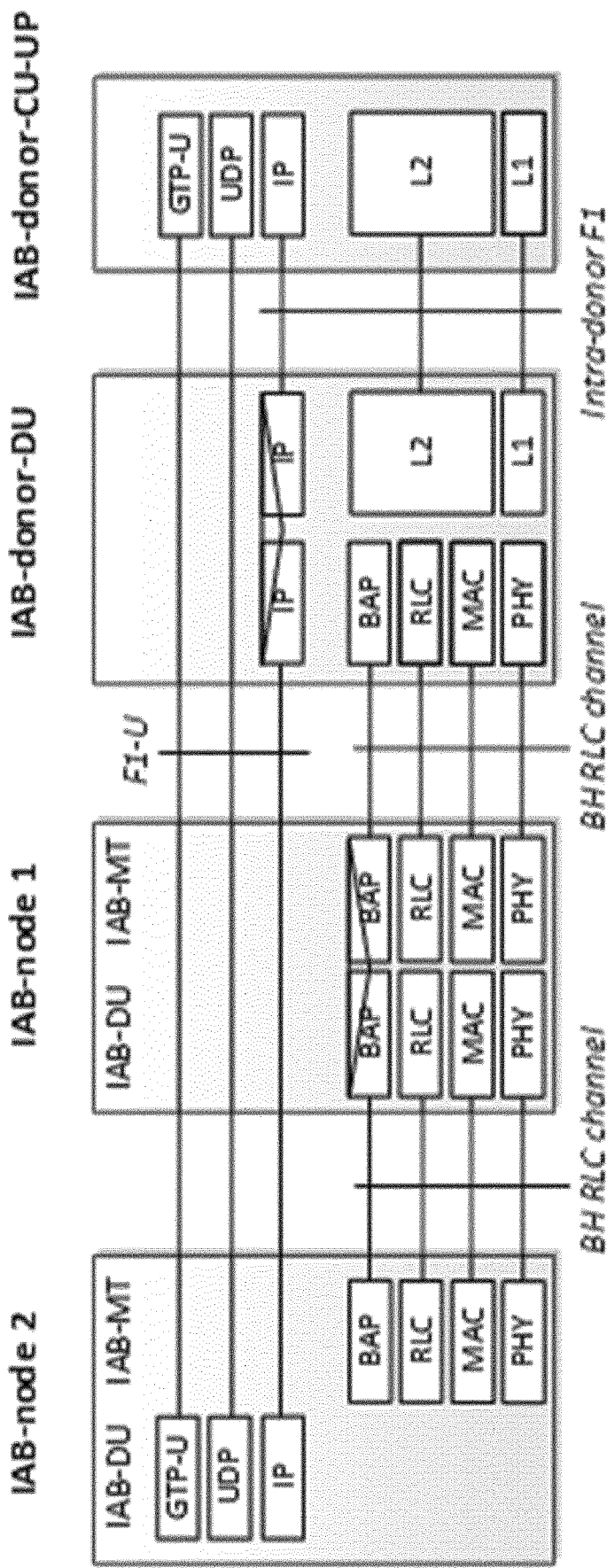
FIG. 2 illustrates a baseline user plane protocol stack for IAB
Figure 3:
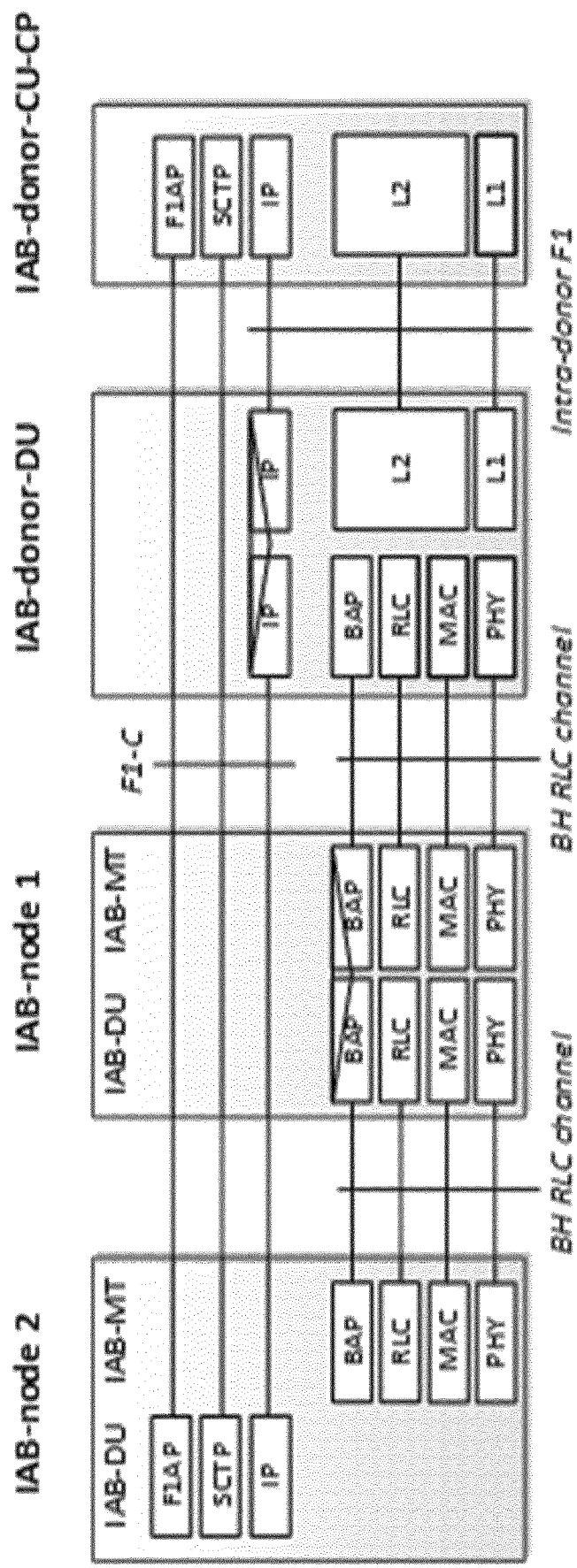
FIG. 3 illustrates a baseline control plane protocol stack for IAB.
Figure 4:
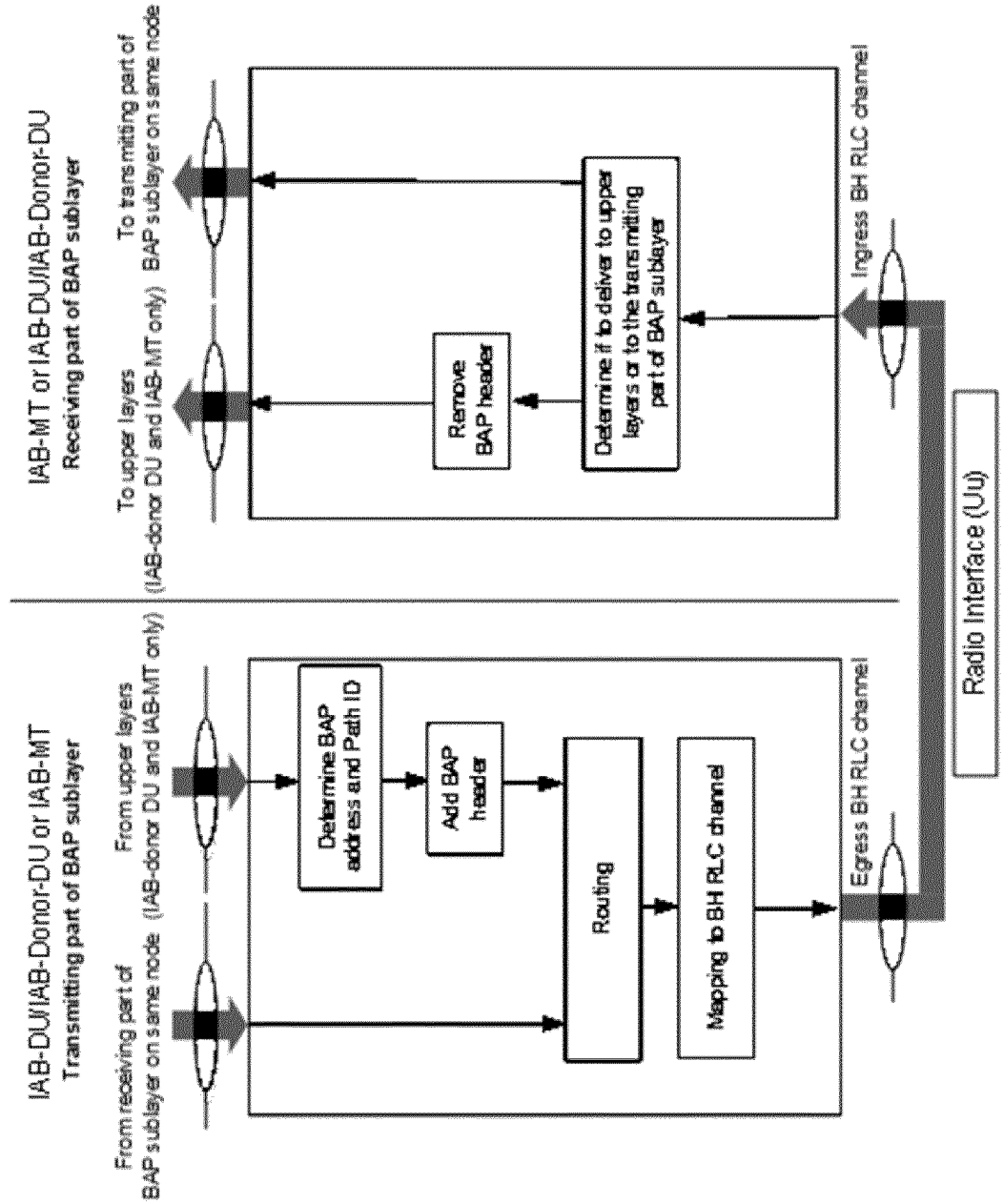
FIG. 4 illustrates an example functional view of the BAP sublayer.
Figure 5:
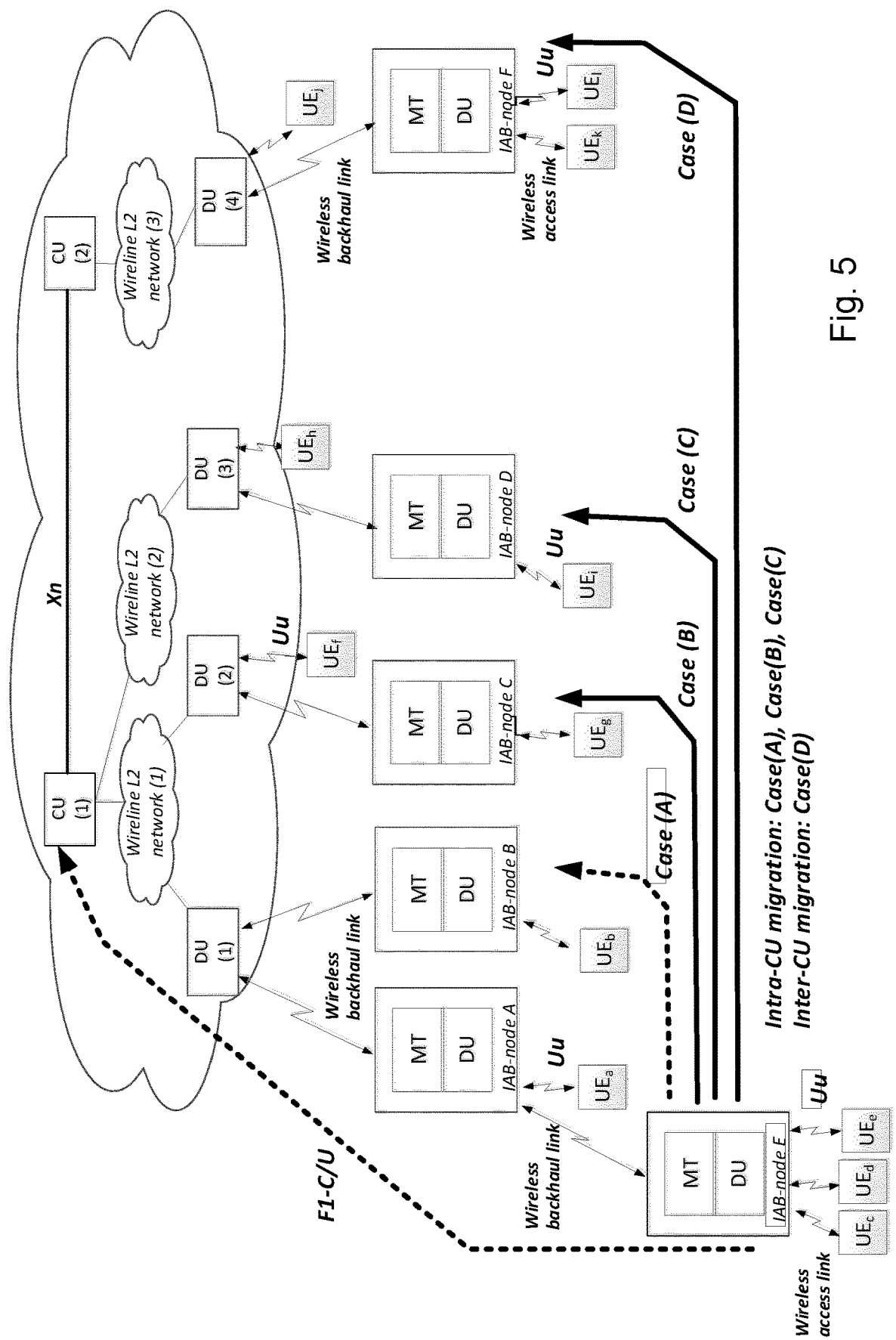
FIG. 5 illustrates an example of possible IAB-node migration cases listed in the order of complexity.
Figure 6:
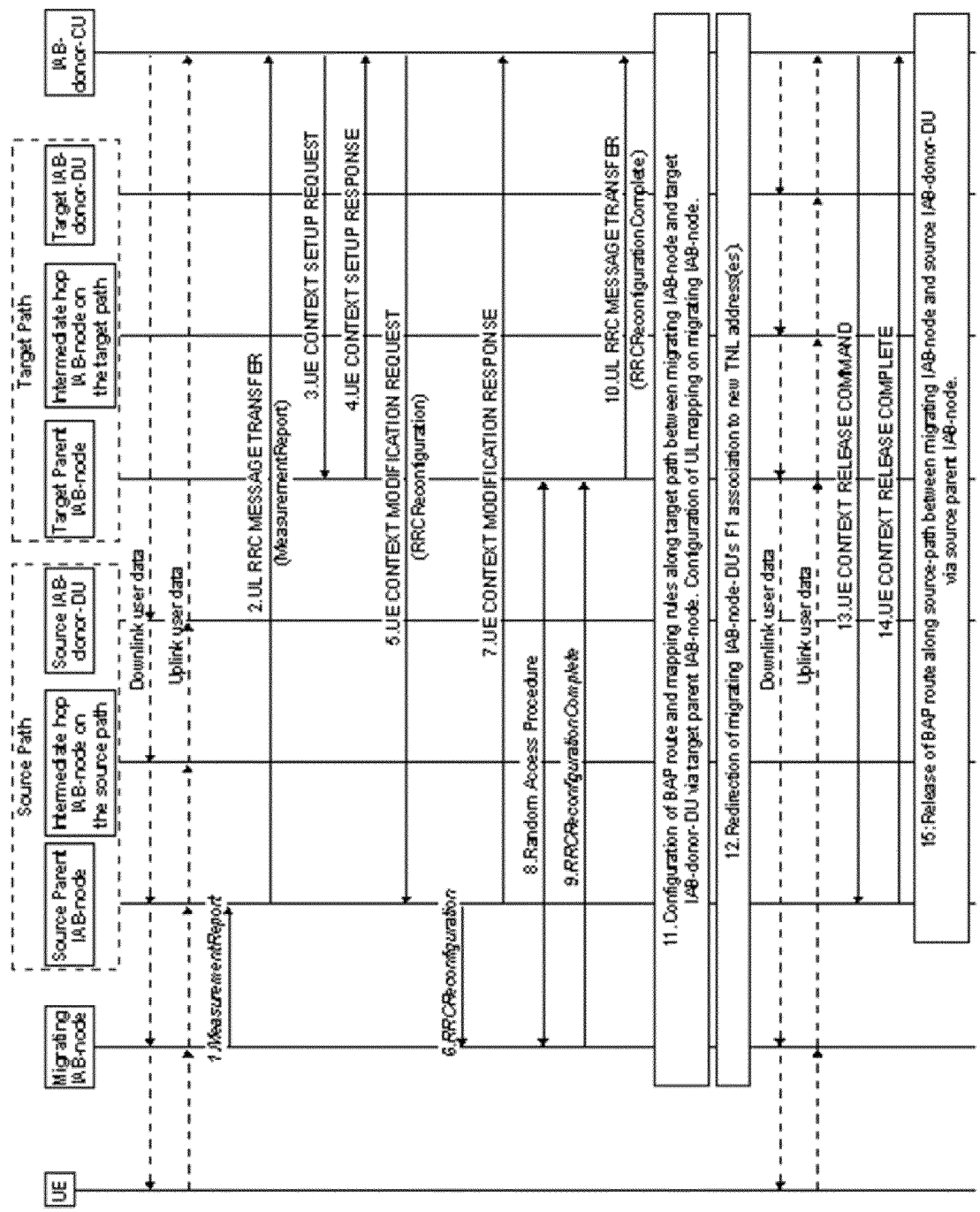
FIG. 6 illustrates an example topology adaptation procedure, where the target parent node uses a different IAB-donor-DU than the source parent node.
Figure 7:
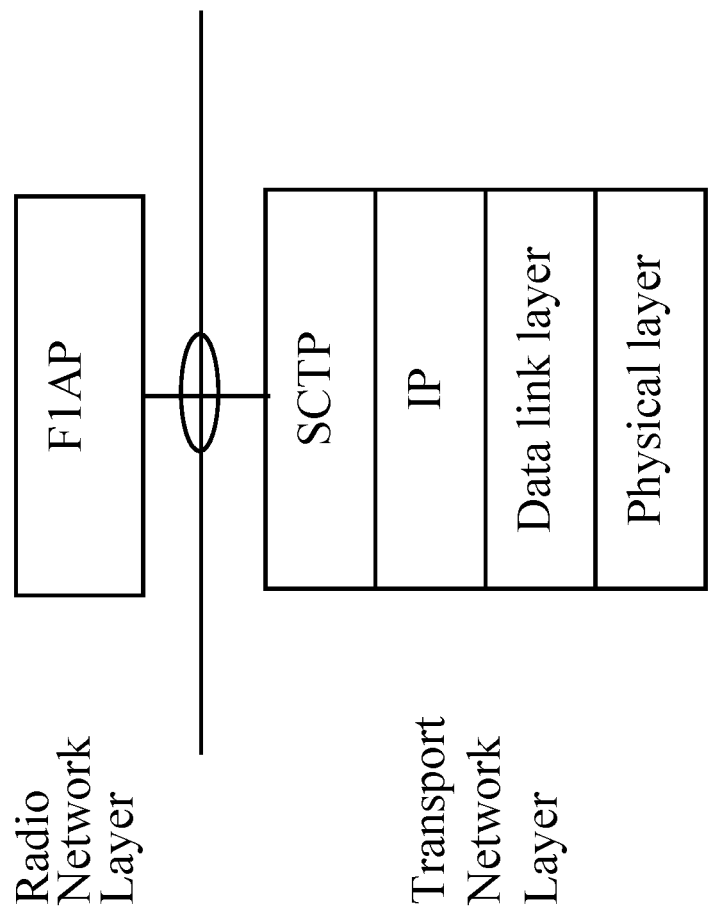
FIG. 7 illustrates the F1-C Signalling Bearer protocol stack.
Figure 8:
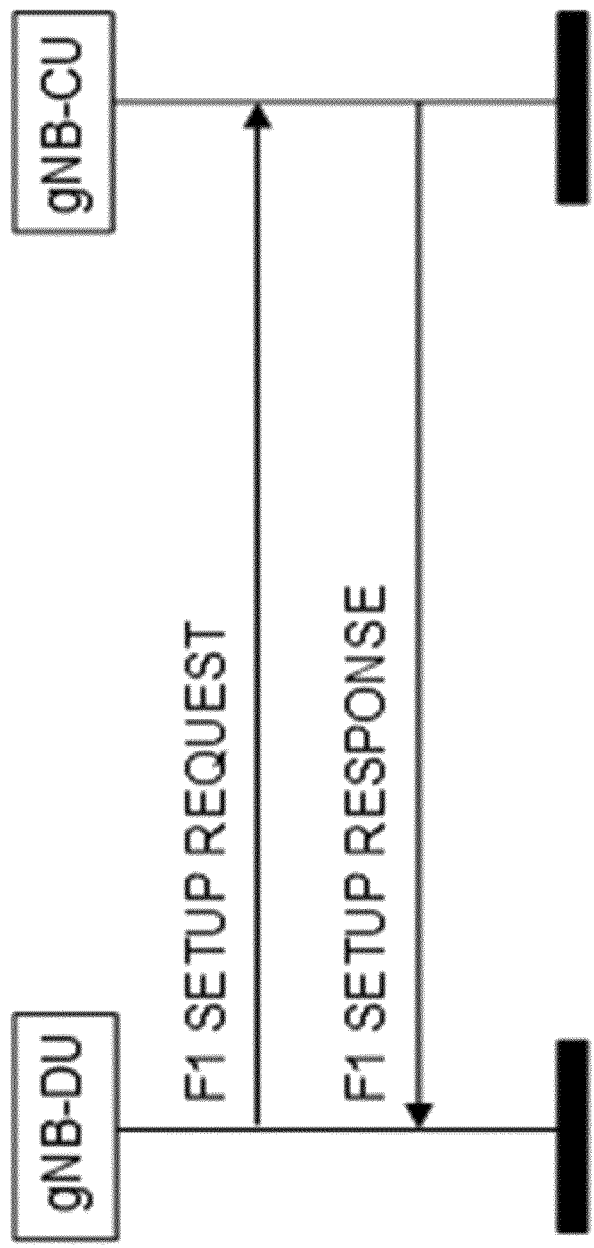
FIG. 8 is a flow diagram illustrating a successful F1 setup procedure.
Figure 9:
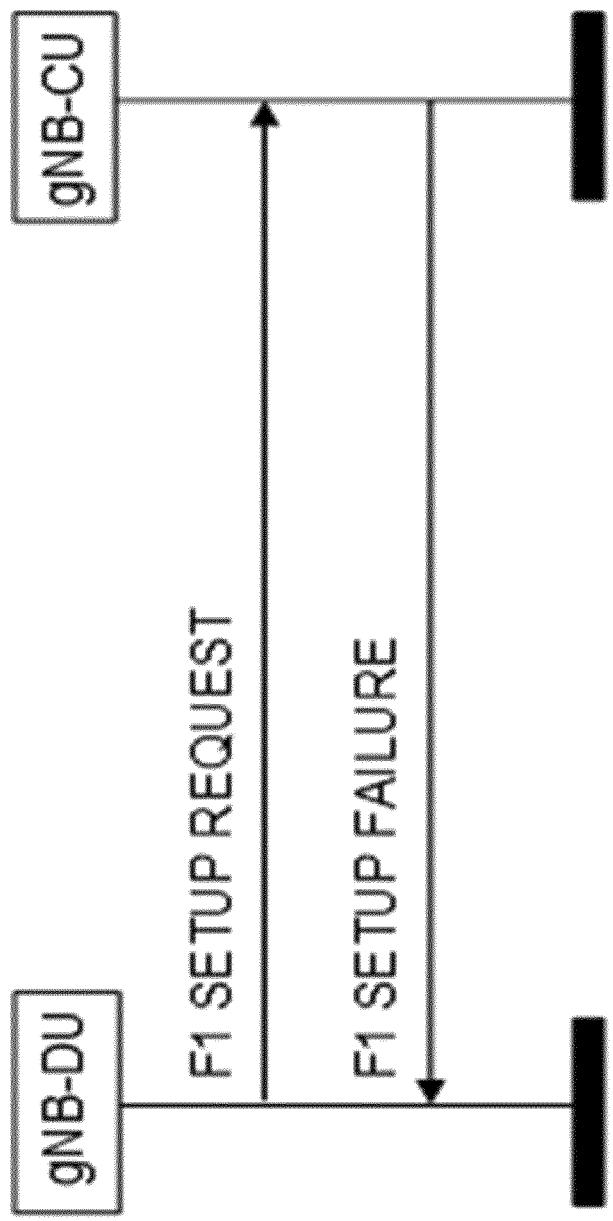
FIG. 9 is a flow diagram illustrating an unsuccessful F1 setup procedure.
Figure 10:
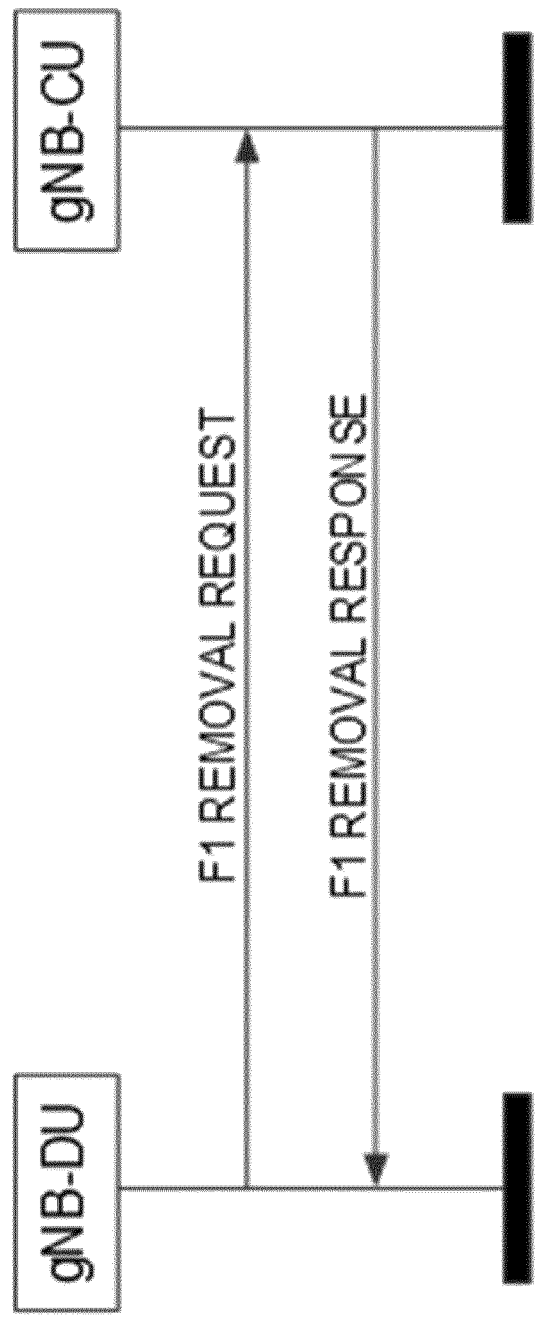
FIG. 10 is a flow diagram illustrating gNB-DU initiated successful F1 removal.
Figure 11:
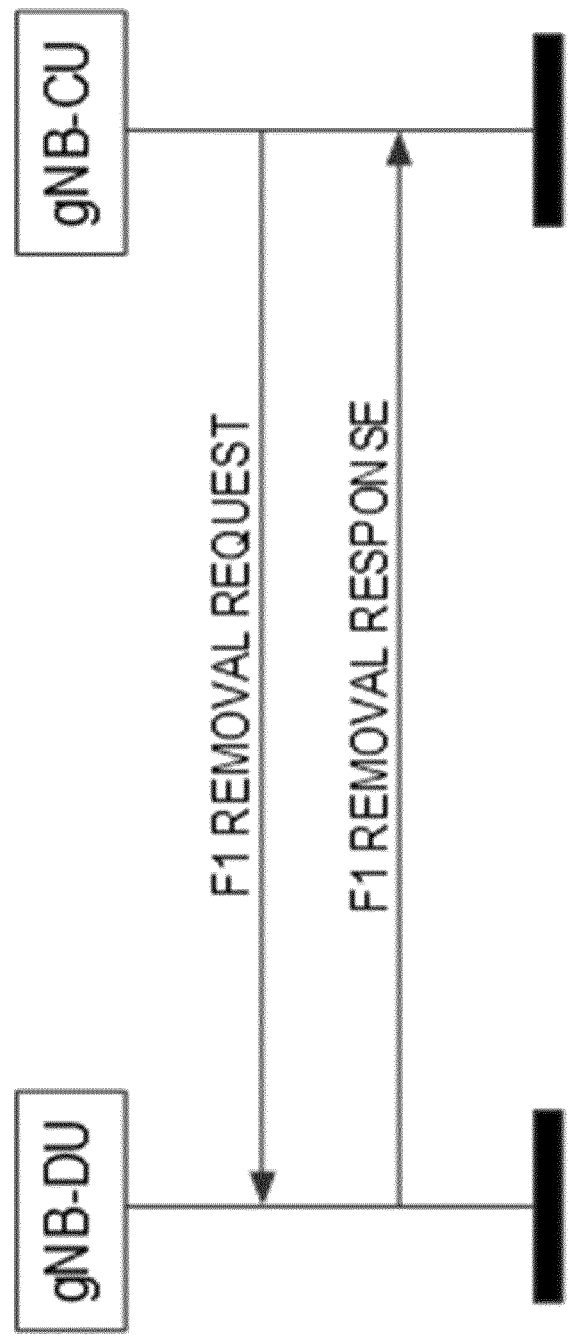
FIG. 11 is a flow diagram illustrating gNB-CU initiated successful F1 removal.
Figure 12:
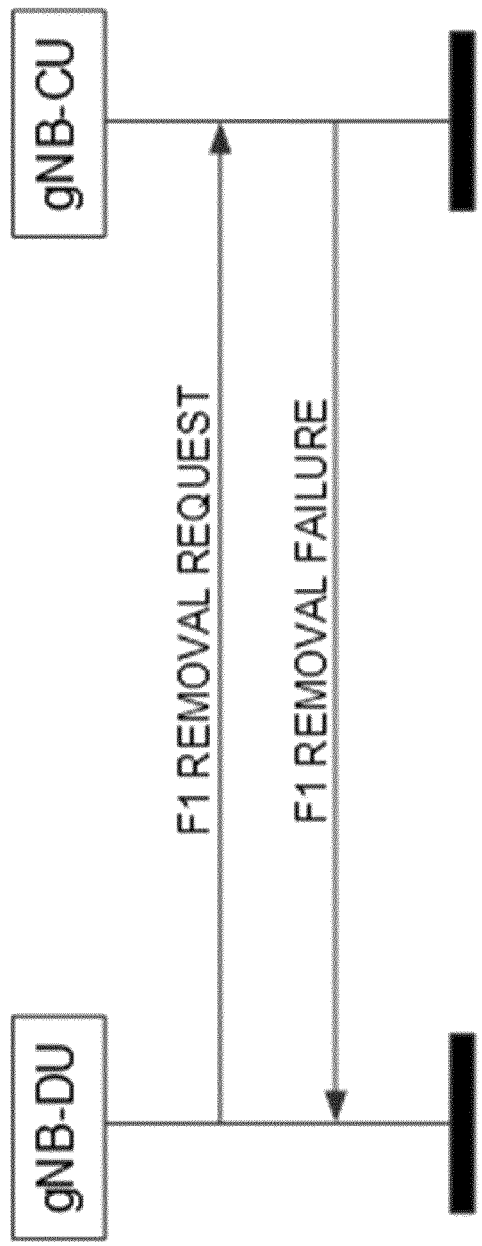
FIG. 12 is a flow diagram illustrating gNB-DU initiated unsuccessful F1 removal.
Figure 13:
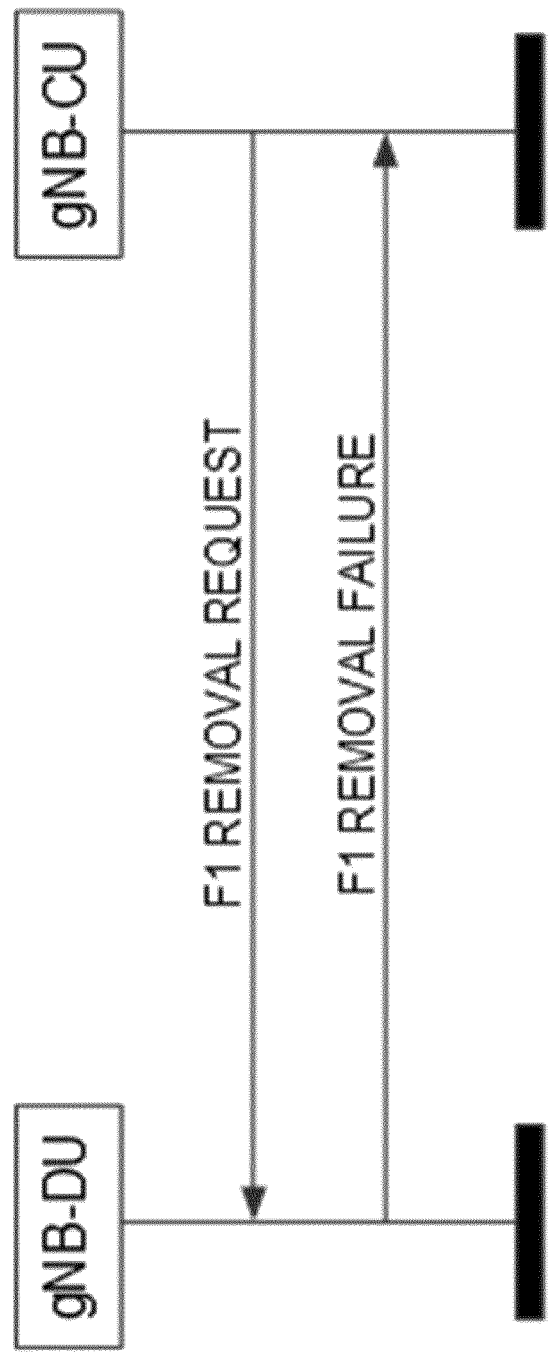
FIG. 13 is a flow diagram illustrating gNB-CU initiated unsuccessful F1 removal.

As described above, certain challenges currently exist with inter-control unit (inter-CU) migration for integrated access and backhaul (IAB) node relocation. For example, one problem that needs to be solved when an IAB node is handed over from one donor CU to another donor CU is the relocation/setup of the F1 connection between the IAB node and the new CU.

Certain aspects of the present disclosure and their embodiments may provide solutions to these or other challenges. For example, particular embodiments include CU-triggered/initiated F1 setup/relocation in an IAB network. Some embodiments include relocating the F1 connection of an IAB node from one donor CU to another during an inter-CU IAB migration.

Particular embodiments are described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

As described herein, the inter-CU IAB node migration may be caused by, e.g., radio link failure (RLF), load balancing, and/or IAB node mobility. These are non-limiting examples. The terms "gNB-CU" and "Donor-CU", "CU-CP" and "CU" are used interchangeably. All considerations for a split donor (i.e., donor CU) are equally applicable for a non-split donor (i.e., donor gNB). The terms "backhaul RLC channel" and "BH RLC channel" and "BH bearer" are used interchangeably.

Particular embodiments are described on a handover of an IAB-node working in standalone mode but are equally applicable to IAB-nodes in EN-DC mode, when changing the MeNB and/or SgNB. The term "gNB" applies to all variants therein, e.g. "gNB", "en-gNB" etc. The terms "transport layer information", "transport layer address" and "IP address" are used interchangeably.

If IPsec is used to protect the F1 traffic, the "transport layer information" includes both the inner and the outer IP address. Unless otherwise specified by F1 connection, the term refers to F1-C signaling connection. The terms "target CU" and "target", as well as "source CU" and "source", are used interchangeably. The term "transport layer information" could refer to control plane and/or user plane (e.g., CU-CP addresses, CU-UP addresses, etc.).

Although the F1 messages in the embodiments below are referred to with legacy names (e.g., Handover Request, Handover Request Acknowledge, F1 Setup Request, F1 Setup Response, F1 Removal Request, F1 Removal Response), new messages may be used for the indicated purposes. If legacy messages are used, the enhancements of the legacy messages are described.

A first group of embodiments is referred to as embodiment group A. In these embodiments, an IAB node is provided with information about the target donor CU, e.g., transport layer address (if IPsec is used, the provision of inner and outer IP address of donor CU is included) during the relocation procedure. This can be done in one or more of the following ways.

The information may be included in the handover command (i.e., RRCReconfiguration containing a reconfiguration with sync) for the IAB-MT. The information may be an information element (IE) or a set of IEs inside the radio resource control (RRC) message and this, along with reconfiguration message, are generated by the target CU.

Alternatively, the source CU may have the required information, or the target CU may provide it to the source CU in one of the following ways: 1) inside the HANDOVER REQUEST ACK message; 2) in advance, as a part of the Xn Setup procedure and messages therein; 3) in advance, inside the NG-RAN node Configuration Update and messages therein. The source CU then can send this information in an F1-AP message to the distributed unit (DU) of the IAB node or in an RRC message to the IAB-MT, in parallel while sending/forwarding the handover command (i.e., CU can send this just like any other F1-AP or RRC message).

The information may be provided to the IAB node prior to the migration procedure, where the IAB node is provided with a list (e.g., list of identities) of all the possible parent nodes (donor DUs or other IAB nodes), or/and the cells belonging to the parent nodes, along with the information to use for setting up F1 when the IAB node establishes a connection via one of these parent cells (e.g., transport layer address). This could be performed during the initial IAB integration procedure (when the IAB node is first started), for example, via signaling from OAM. Information may also be provided/updated while the IAB node is up and running under a previous serving node, e.g., using F1-AP signaling, RRC signaling. etc.

In particular embodiments, the IAB node initiates the F1 setup procedure with the target CU, using the information acquired about the target CU from the previous step (e.g., the IP address provided as part of the target CU information provided in the previous step is used as the destination address on the IP packet that is carrying the F1 setup request message).

If the information was provided prior to the handover (e.g., configuration via OAM or previous F1/RRC signaling), then the stored information is used for F1 setup (e.g., by searching for the stored transport layer address corresponding to the target serving cell). If the information was provided during the handover, this could be directly the transport layer information (e.g., IP address) or an index/name referring to a previous stored mapping table (e.g., provided via OAM, previous F1/RRC signaling, etc.), where, in the latter case, the IAB node finds the corresponding transport layer information for the provided index/name.

Figure 14:
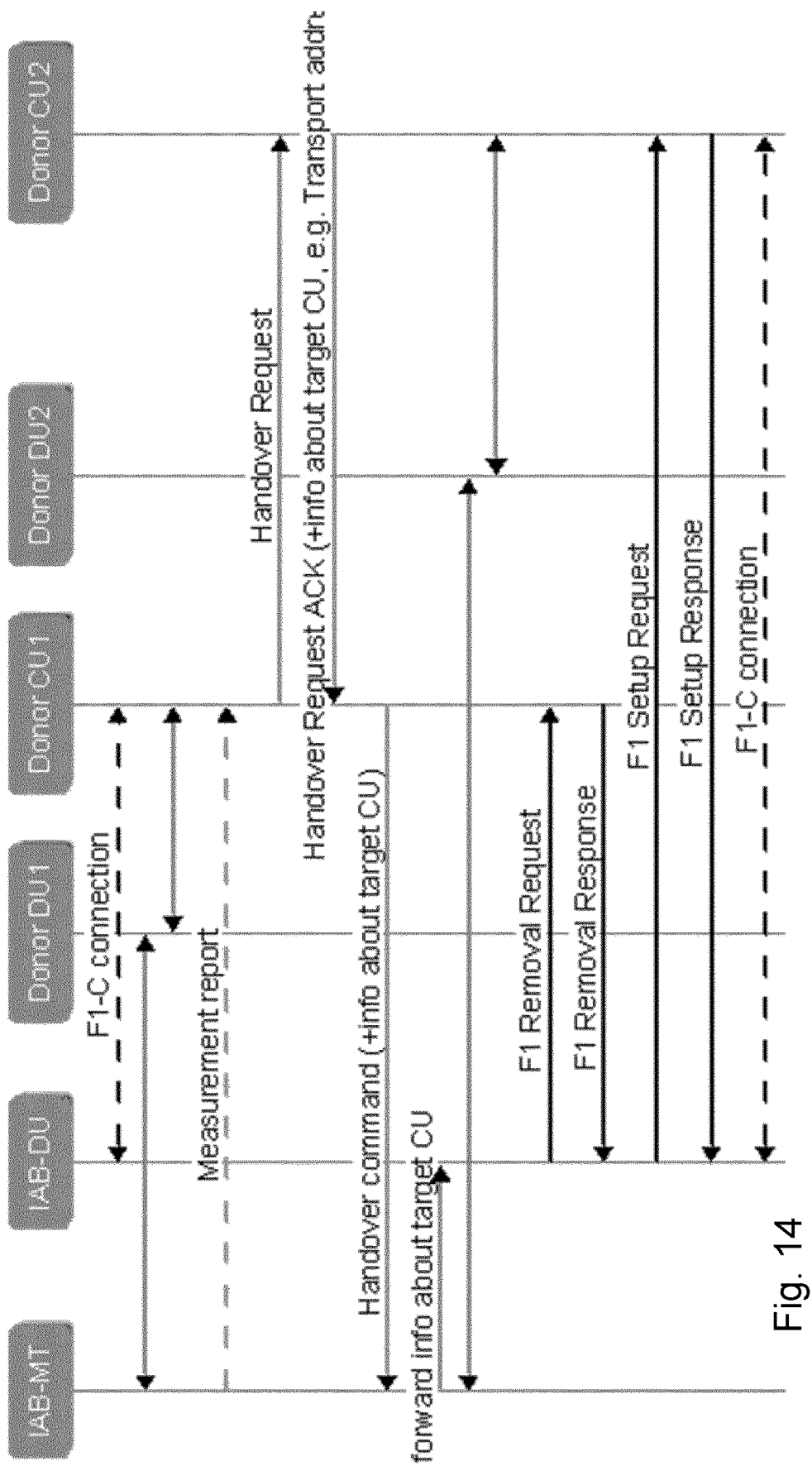
FIG. 14 is a signaling diagram illustrating an example of the first group of embodiments.

FIG. 14 is a signaling diagram illustrating an example of the first group of embodiments. In the illustrated example, Donor CU1 sends a handover request to Donor CU2. Donor CU2 responds information about itself, such as its transport layer address. Donor CU1 includes the information about Donor CU2 in a handover command sent to the IAB-MT. The IAB-DU uses the information to send an F1 setup request to Donor CU2.

In a second group of embodiments, also referred to as embodiment group B, the source donor CU provides information about the IAB node (e.g., transport layer address) to the target donor CU during the handover procedure. Upon the completion of the handover (i.e., reception of a reconfiguration complete message from the MT of the migrating IAB node), the target donor CU initiates an F1 setup procedure to the IAB node.

In some embodiments, this may be a modification of the legacy F1 setup request (which currently can be sent only from the DU to the CU) or a newly defined F1 setup request-like message.

Alternatively, the target CU may invoke the DU of the migrating node to start the F1 setup procedure with the target CU by, e.g., sending an indication to the migrating IAB-MT that triggers the collocated IAB-DU to start F1 setup (reusing the legacy F1 setup procedure). The indication may be sent to the IAB-MT by using an enhancement of an existing RRC message or a new message. The IAB node is provided with, e.g. the transport address, of the target donor CU in advance. This alternative is similar to the first group of embodiments, a difference being that in this case the triggering to send the F1-AP setup request is sent from the target CU, while in the first group of embodiments, the trigger is coming from the source CU.

It is possible for the IAB node to be given a different IP address when it relocates to a new CU (or even to a DU within the same CU). In such cases, the IP address provided by the source CU may not be used to access the IAB node. However, in such cases, the target donor CU or target donor DU may either be responsible for generating the new IP address(es) for the IAB node, or at least they are informed about it, and this will be the destination IP address when sending the F1-AP Request message to the IAB node.

For example, in one alternative, a separate network entity/function other than the CUs or DUs will provide the new IP address and communicate it to the target CU. The target includes it in the handover command (RRC Reconfiguration message), then it will send the F1-AP request message to the IAB node.

Figure 15:
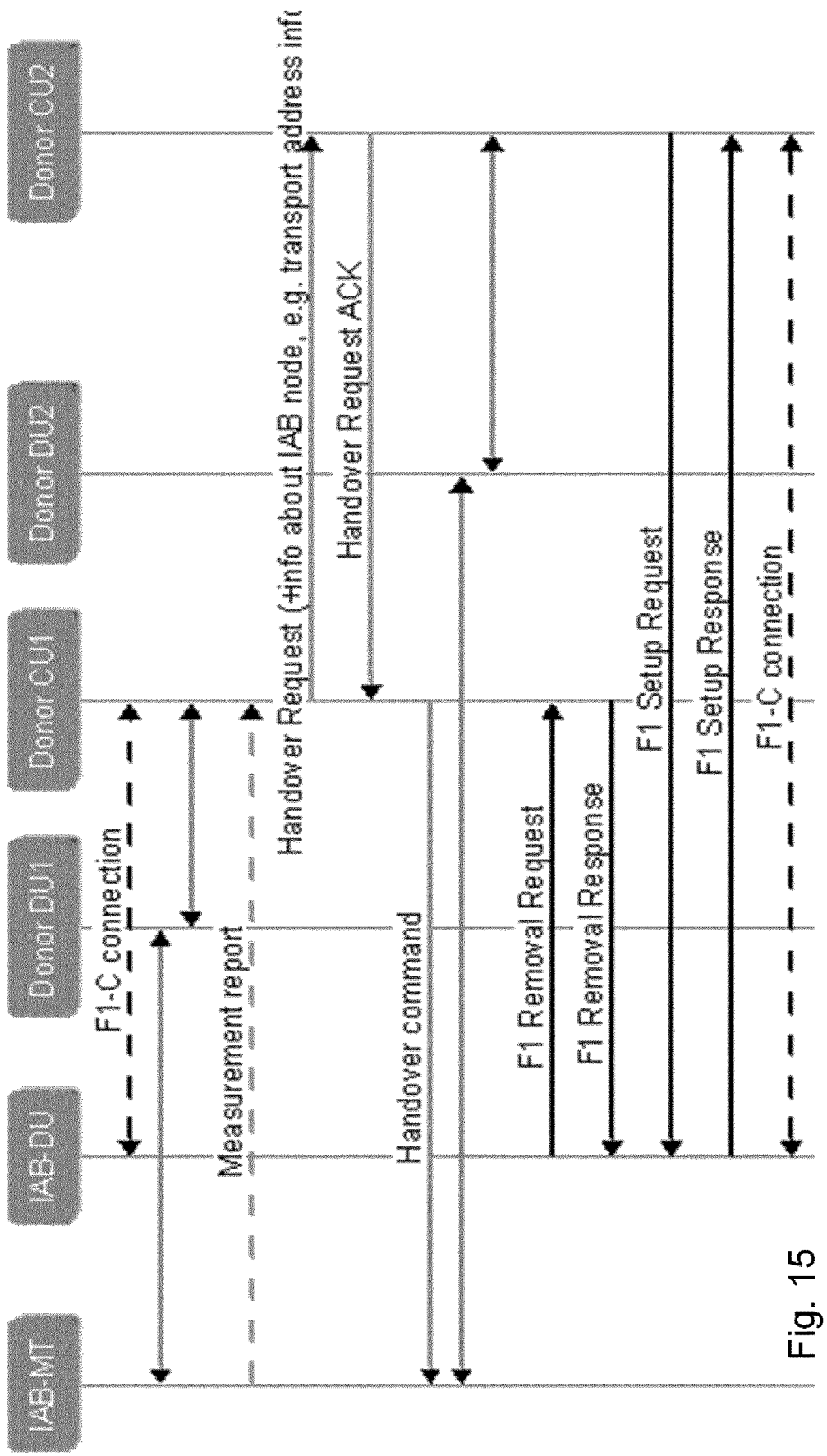
FIG. 15 is a signaling diagram illustrating an example of the second group of embodiments.

FIG. 15 is a signaling diagram illustrating an example of the second group of embodiments. In the illustrated example, Donor CU1 sends a handover request to Donor CU2. The handover request includes information about the IAB node, such as its transport layer address. After the handover of IAB-MT to Donor CU2, Donor CU2 uses the information about the IAB node to send an F1 setup request message to IAB-DU.

In a third group of embodiments, also referred to as embodiment group C, in the handover request, the source donor CU provides to the target donor CU the latest information about the IAB node's end of the F1 connection (i.e., the information received from the IAB node when the F1 connection with the source donor CU is set up, as well as any update of the F1 connection afterwards until the handover, e.g. additional info received via gNB-DU configuration update). This is as if the target has "pre-fetched" the F1 context or the F1 setup request from the IAB node.

On completion of the handover (e.g., reception of the Reconfiguration Complete message), the target donor CU sends to the IAB node an F1 setup response message (because it has obtained in the previous step all the information that is currently provided in F1 Setup Request). The response message may be a modified version of the legacy F1 Setup Response message or a new message. This means that the F1 setup is executed without the IAB node DU having to send the F1 Setup Request.

Figure 16:
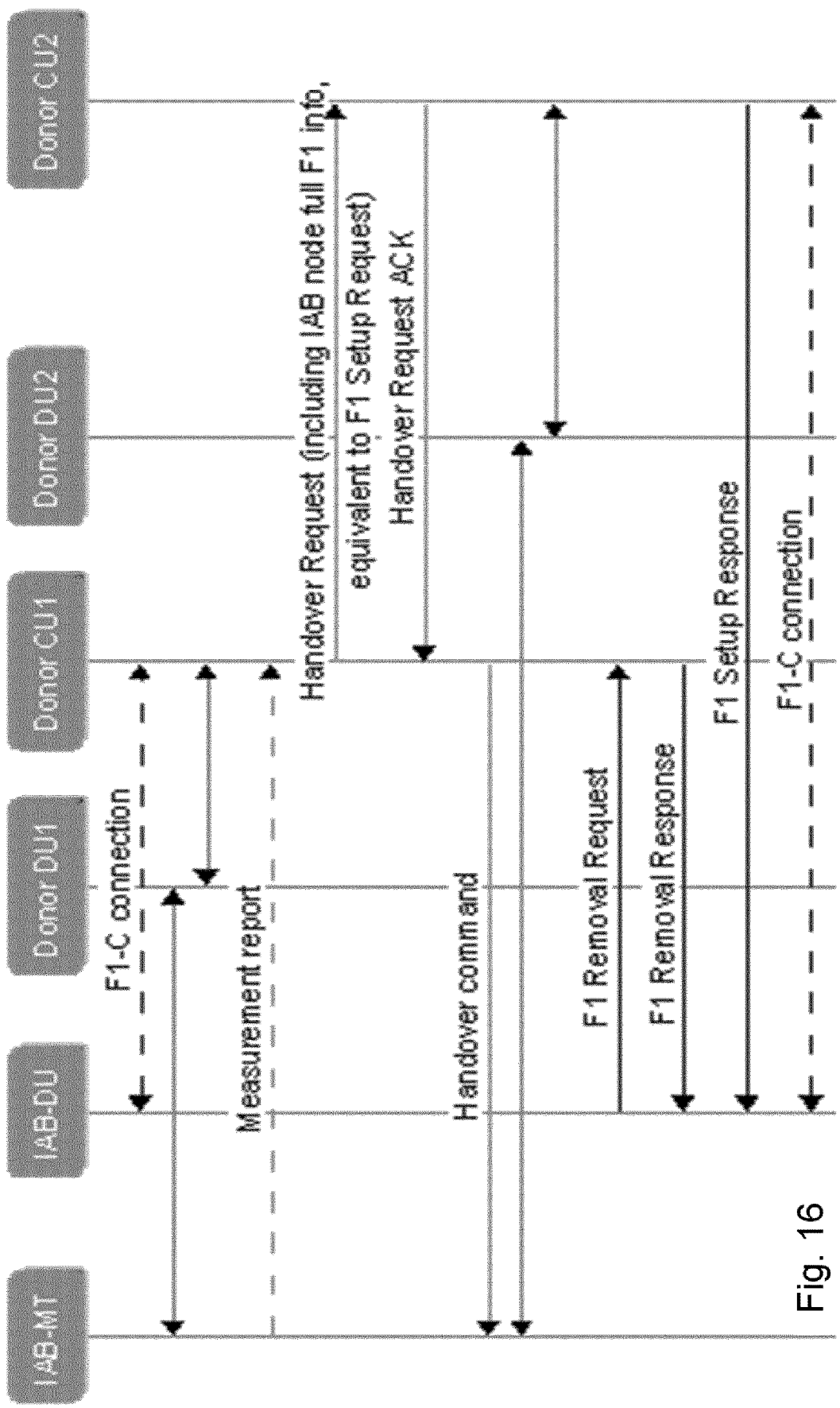
FIG. 16 is a signaling diagram illustrating an example of the third group of embodiments.

FIG. 16 is a signaling diagram illustrating an example of the third group of embodiments. In the illustrated example, Donor CU1 sends a handover request to Donor CU2. The handover request includes information about the Donor CU1 F1 interface with the IAB node, such as its F1 context. After the handover of IAB-MT to Donor CU2, Donor CU2 uses the information about the IAB node to send an F1 setup response to IAB-DU.

A fourth group of embodiments, also referred to as embodiment group D, includes the same step as in the third group of embodiments, where the source includes, in the handover request, the latest information about the IAB node's end of the F1 connection. This is as if the target has "pre-fetched" the F1 context or the F1 setup request from the IAB node. The handover request message may carry the F1 contexts of one or more IAB nodes. These IAB nodes may or may not be in the same group of migrating IAB nodes.

In the handover response message, the target includes the information that it normally provides as a response to an F1 setup request message (the information equivalent to F1 setup request was provided in a previous step).

The source forwards the received information to the IAB node, along with the handover command (Reconfiguration received from the target, which includes all the information that is currently provided in F1 Setup Request). This response message could be a modified version of the legacy F1 Setup Response message or a new message.

Figure 17:
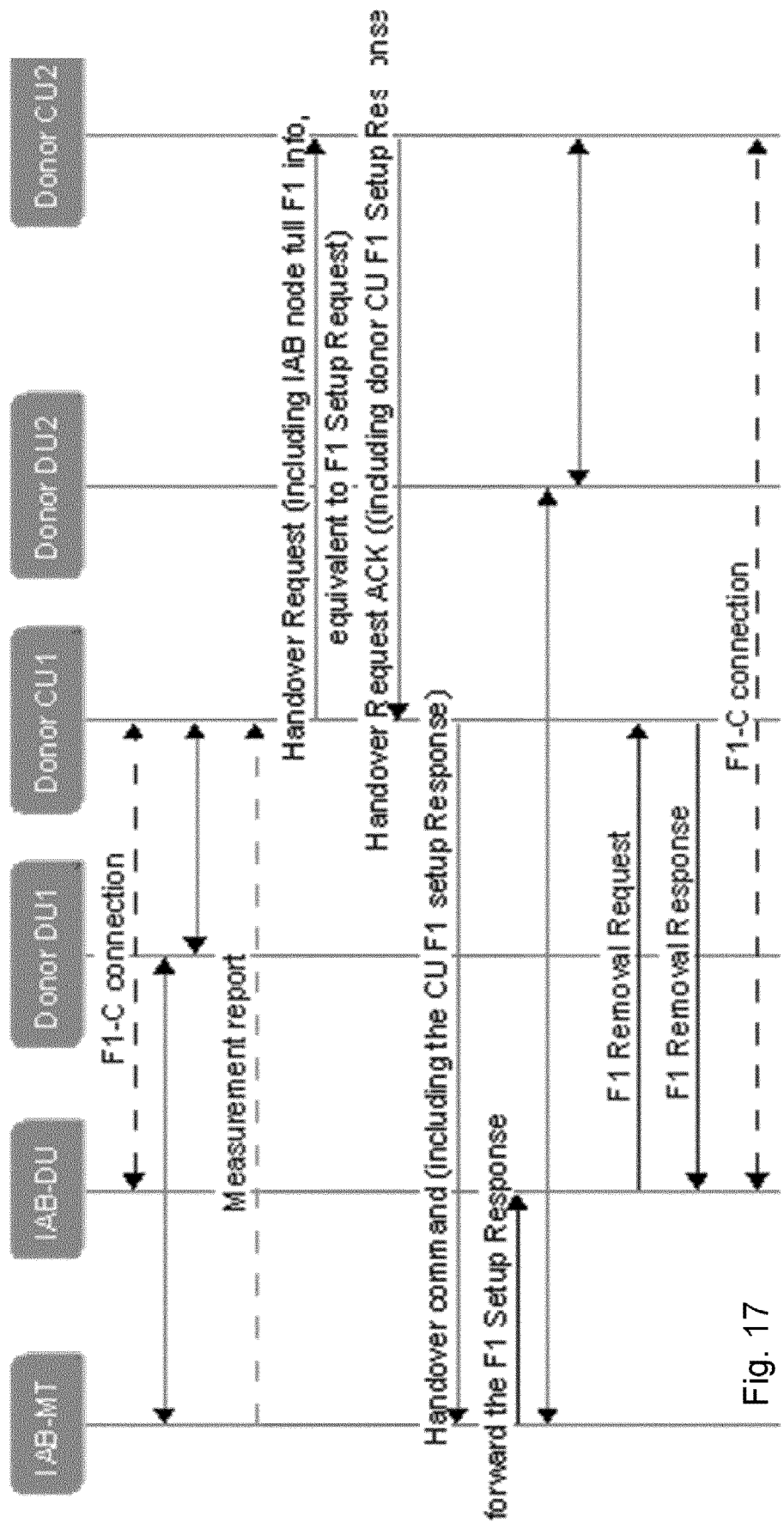
FIG. 17 is a signaling diagram illustrating an example of the fourth group of embodiments.

FIG. 17 is a signaling diagram illustrating an example of the third group of embodiments. In the illustrated example, Donor CU1 sends a handover request to Donor CU2. The handover request includes information about the Donor CU1 F1 interface with the IAB node, such as its F1 context. Donor CU2 responds to Donor CU1 with its F1 context information for an F1 interface between the IAB-DU and Donor CU2. After the handover of IAB-MT to Donor CU2, the F1 interface is already established because both the IAB node and Doner CU2 already have all the F1 information needed.

In the above embodiments, the F1 removal procedure with the source CU could be initiated either by the source CU or the IAB node, and performed, for example, as an intermediate step between the handing over of the IAB-MT and the setup of the F1 connection with the target CU.

In one variant, if the source donor CU receives and F1 removal request from an IAB node that serves a number of other IAB nodes, the source donor CU may consider that the F1 removal request applies for both the IAB node that sent the F1 removal request, and all the IAB nodes served (directly or indirectly) by the IAB node.

As described above, at least one SCTP association (and related SCTP streams) needs to be established between a CU and DU to enable an F1 connection. Thus, in the embodiments above, an SCTP association is established for the F1-C connection to be up and running. For example, in embodiment groups A to C, the SCTP association is established to transport the required messages (F1-AP Setup Request/Response) to setup the F1-C. In embodiment group D, even if there is no need to explicitly send the F1-AP Setup Request/response messages, the SCTP association is established to enable and subsequent F1-C signaling.

The following is a description of a wireless network and components of the network.

Figure 18:
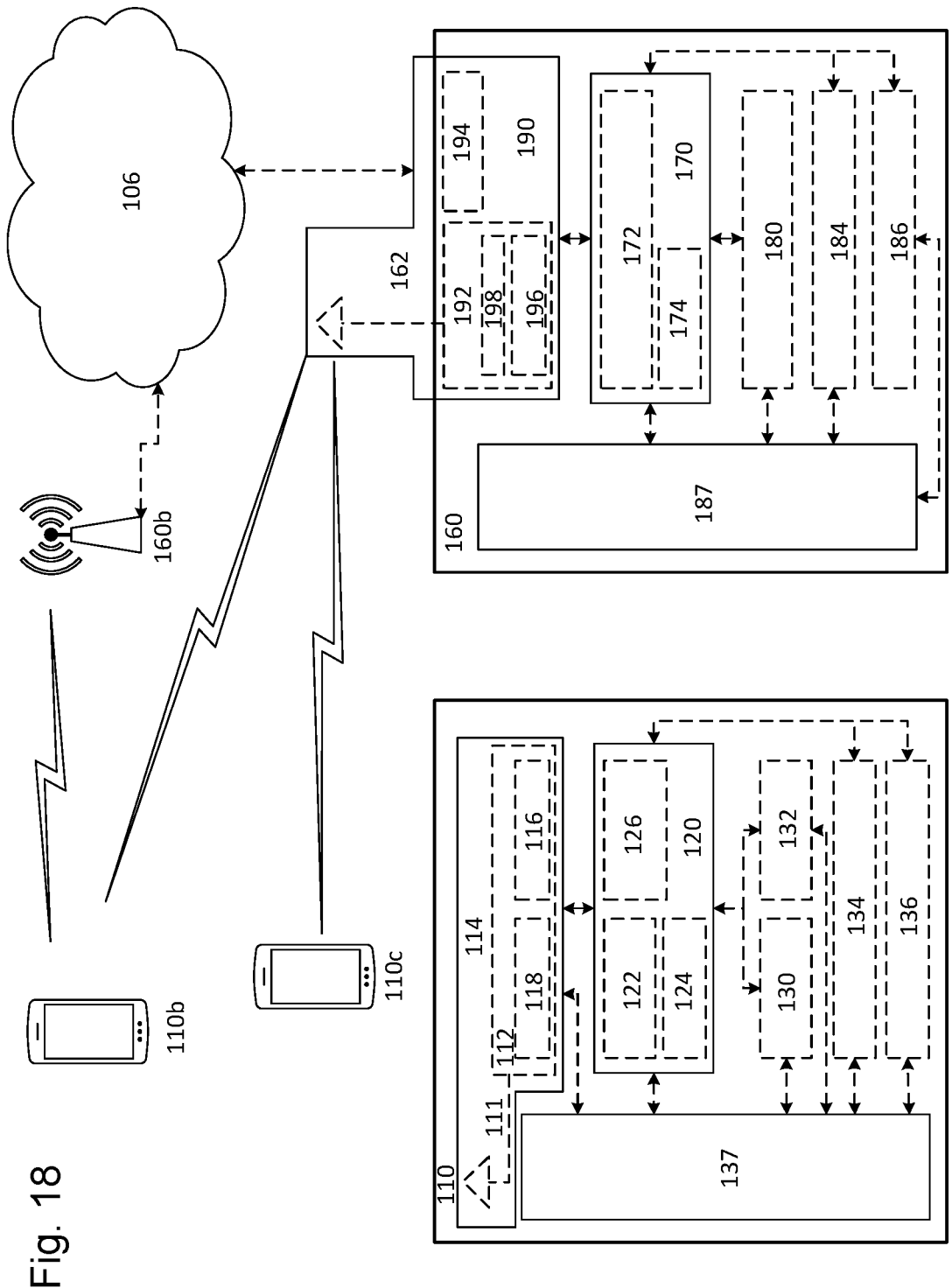
FIG. 18 is a block diagram illustrating an example wireless network.

FIG. 18 illustrates an example wireless network, according to certain embodiments. The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 160 and WD 110 comprise various components described in more detail below. These components work together to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs.

As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 18, network node 160 includes processing circuitry 170, device readable medium 180, interface 190, auxiliary equipment 184, power source 186, power circuitry 187, and antenna 162. Although network node 160 illustrated in the example wireless network of FIG. 18 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 160 are depicted as single boxes located within a larger box, or nested within multiple boxes, in practice, a network node may comprise multiple different physical components that make up a single illustrated component (e.g., device readable medium 180 may comprise multiple separate hard drives as well as multiple RAM modules).

Similarly, network node 160 may be composed of multiple physically separate components (e.g., a NodeB component and a RNC component, or a BTS component and a BSC component, etc.), which may each have their own respective components. In certain scenarios in which network node 160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node.

In some embodiments, network node 160 may be configured to support multiple radio access technologies (RATs). In such embodiments, some components may be duplicated (e.g., separate device readable medium 180 for the different RATs) and some components may be reused (e.g., the same antenna 162 may be shared by the RATs). Network node 160 may also include multiple sets of the various illustrated components for different wireless technologies integrated into network node 160, such as, for example, GSM, WCDMA, LTE, NR, WiFi, or Bluetooth wireless technologies. These wireless technologies may be integrated into the same or different chip or set of chips and other components within network node 160.

Processing circuitry 170 is configured to perform any determining, calculating, or similar operations (e.g., certain obtaining operations) described herein as being provided by a network node. These operations performed by processing circuitry 170 may include processing information obtained by processing circuitry 170 by, for example, converting the obtained information into other information, comparing the obtained information or converted information to information stored in the network node, and/or performing one or more operations based on the obtained information or converted information, and as a result of said processing making a determination.

Processing circuitry 170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 160 components, such as device readable medium 180, network node 160 functionality.

For example, processing circuitry 170 may execute instructions stored in device readable medium 180 or in memory within processing circuitry 170. Such functionality may include providing any of the various wireless features, functions, or benefits discussed herein. In some embodiments, processing circuitry 170 may include a system on a chip (SOC).

In some embodiments, processing circuitry 170 may include one or more of radio frequency (RF) transceiver circuitry 172 and baseband processing circuitry 174. In some embodiments, radio frequency (RF) transceiver circuitry 172 and baseband processing circuitry 174 may be on separate chips (or sets of chips), boards, or units, such as radio units and digital units. In alternative embodiments, part or all of RF transceiver circuitry 172 and baseband processing circuitry 174 may be on the same chip or set of chips, boards, or units In certain embodiments, some or all of the functionality described herein as being provided by a network node, base station, eNB or other such network device may be performed by processing circuitry 170 executing instructions stored on device readable medium 180 or memory within processing circuitry 170. In alternative embodiments, some or all of the functionality may be provided by processing circuitry 170 without executing instructions stored on a separate or discrete device readable medium, such as in a hard-wired manner. In any of those embodiments, whether executing instructions stored on a device readable storage medium or not, processing circuitry 170 can be configured to perform the described functionality. The benefits provided by such functionality are not limited to processing circuitry 170 alone or to other components of network node 160 but are enjoyed by network node 160 as a whole, and/or by end users and the wireless network generally.

Device readable medium 180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 170. Device readable medium 180 may store any suitable instructions, data or information, including a computer program, software, an application including one or more of logic, rules, code, tables, etc. and/or other instructions capable of being executed by processing circuitry 170 and, utilized by network node 160. Device readable medium 180 may be used to store any calculations made by processing circuitry 170 and/or any data received via interface 190. In some embodiments, processing circuitry 170 and device readable medium 180 may be considered to be integrated.

Interface 190 is used in the wired or wireless communication of signaling and/or data between network node 160, network 106, and/or WDs 110. As illustrated, interface 190 comprises port(s)/terminal(s) 194 to send and receive data, for example to and from network 106 over a wired connection. Interface 190 also includes radio front end circuitry 192 that may be coupled to, or in certain embodiments a part of, antenna 162.

Radio front end circuitry 192 comprises filters 198 and amplifiers 196. Radio front end circuitry 192 may be connected to antenna 162 and processing circuitry 170. Radio front end circuitry may be configured to condition signals communicated between antenna 162 and processing circuitry 170. Radio front end circuitry 192 may receive digital data that is to be sent out to other network nodes or WDs via a wireless connection. Radio front end circuitry 192 may convert the digital data into a radio signal having the appropriate channel and bandwidth parameters using a combination of filters 198 and/or amplifiers 196. The radio signal may then be transmitted via antenna 162. Similarly, when receiving data, antenna 162 may collect radio signals which are then converted into digital data by radio front end circuitry 192. The digital data may be passed to processing circuitry 170. In other embodiments, the interface may comprise different components and/or different combinations of components.

In certain alternative embodiments, network node 160 may not include separate radio front end circuitry 192, instead, processing circuitry 170 may comprise radio front end circuitry and may be connected to antenna 162 without separate radio front end circuitry 192. Similarly, in some embodiments, all or some of RF transceiver circuitry 172 may be considered a part of interface 190. In still other embodiments, interface 190 may include one or more ports or terminals 194, radio front end circuitry 192, and RF transceiver circuitry 172, as part of a radio unit (not shown), and interface 190 may communicate with baseband processing circuitry 174, which is part of a digital unit (not shown).

Antenna 162 may include one or more antennas, or antenna arrays, configured to send and/or receive wireless signals. Antenna 162 may be coupled to radio front end circuitry 192 and may be any type of antenna capable of transmitting and receiving data and/or signals wirelessly. In some embodiments, antenna 162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 162 may be separate from network node 160 and may be connectable to network node 160 through an interface or port.

Antenna 162, interface 190, and/or processing circuitry 170 may be configured to perform any receiving operations and/or certain obtaining operations described herein as being performed by a network node. Any information, data and/or signals may be received from a wireless device, another network node and/or any other network equipment. Similarly, antenna 162, interface 190, and/or processing circuitry 170 may be configured to perform any transmitting operations described herein as being performed by a network node. Any information, data and/or signals may be transmitted to a wireless device, another network node and/or any other network equipment.

Power circuitry 187 may comprise, or be coupled to, power management circuitry and is configured to supply the components of network node 160 with power for performing the functionality described herein. Power circuitry 187 may receive power from power source 186. Power source 186 and/or power circuitry 187 may be configured to provide power to the various components of network node 160 in a form suitable for the respective components (e.g., at a voltage and current level needed for each respective component). Power source 186 may either be included in, or external to, power circuitry 187 and/or network node 160.

For example, network node 160 may be connectable to an external power source (e.g., an electricity outlet) via an input circuitry or interface such as an electrical cable, whereby the external power source supplies power to power circuitry 187. As a further example, power source 186 may comprise a source of power in the form of a battery or battery pack which is connected to, or integrated in, power circuitry 187. The battery may provide backup power should the external power source fail. Other types of power sources, such as photovoltaic devices, may also be used.

Alternative embodiments of network node 160 may include additional components beyond those shown in FIG. 18 that may be responsible for providing certain aspects of the network node's functionality, including any of the functionality described herein and/or any functionality necessary to support the subject matter described herein. For example, network node 160 may include user interface equipment to allow input of information into network node 160 and to allow output of information from network node 160. This may allow a user to perform diagnostic, maintenance, repair, and other administrative functions for network node 160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air.

In some embodiments, a WD may be configured to transmit and/or receive information without direct human interaction. For instance, a WD may be designed to transmit information to a network on a predetermined schedule, when triggered by an internal or external event, or in response to requests from the network.

Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device.

As yet another specific example, in an Internet of Things (IoT) scenario, a WD may represent a machine or other device that performs monitoring and/or measurements and transmits the results of such monitoring and/or measurements to another WD and/or a network node. The WD may in this case be a machine-to-machine (M2M) device, which may in a 3GPP context be referred to as an MTC device. As one example, the WD may be a UE implementing the 3GPP narrow band internet of things (NB-IoT) standard. Examples of such machines or devices are sensors, metering devices such as power meters, industrial machinery, or home or personal appliances (e.g. refrigerators, televisions, etc.) personal wearables (e.g., watches, fitness trackers, etc.).

In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 110 includes antenna 111, interface 114, processing circuitry 120, device readable medium 130, user interface equipment 132, auxiliary equipment 134, power source 136 and power circuitry 137. WD 110 may include multiple sets of one or more of the illustrated components for different wireless technologies supported by WD 110, such as, for example, GSM, WCDMA, LTE, NR, WiFi, WiMAX, or Bluetooth wireless technologies, just to mention a few. These wireless technologies may be integrated into the same or different chips or set of chips as other components within WD 110.

Antenna 111 may include one or more antennas or antenna arrays, configured to send and/or receive wireless signals, and is connected to interface 114. In certain alternative embodiments, antenna 111 may be separate from WD 110 and be connectable to WD 110 through an interface or port. Antenna 111, interface 114, and/or processing circuitry 120 may be configured to perform any receiving or transmitting operations described herein as being performed by a WD. Any information, data and/or signals may be received from a network node and/or another WD. In some embodiments, radio front end circuitry and/or antenna 111 may be considered an interface.

As illustrated, interface 114 comprises radio front end circuitry 112 and antenna 111. Radio front end circuitry 112 comprise one or more filters 118 and amplifiers 116. Radio front end circuitry 112 is connected to antenna 111 and processing circuitry 120 and is configured to condition signals communicated between antenna 111 and processing circuitry 120. Radio front end circuitry 112 may be coupled to or a part of antenna 111. In some embodiments, WD 110 may not include separate radio front end circuitry 112; rather, processing circuitry 120 may comprise radio front end circuitry and may be connected to antenna 111. Similarly, in some embodiments, some or all of RF transceiver circuitry 122 may be considered a part of interface 114.

Radio front end circuitry 112 may receive digital data that is to be sent out to other network nodes or WDs via a wireless connection. Radio front end circuitry 112 may convert the digital data into a radio signal having the appropriate channel and bandwidth parameters using a combination of filters 118 and/or amplifiers 116. The radio signal may then be transmitted via antenna 111. Similarly, when receiving data, antenna 111 may collect radio signals which are then converted into digital data by radio front end circuitry 112. The digital data may be passed to processing circuitry 120. In other embodiments, the interface may comprise different components and/or different combinations of components.

Processing circuitry 120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 110 components, such as device readable medium 130, WD 110 functionality. Such functionality may include providing any of the various wireless features or benefits discussed herein. For example, processing circuitry 120 may execute instructions stored in device readable medium 130 or in memory within processing circuitry 120 to provide the functionality disclosed herein.

As illustrated, processing circuitry 120 includes one or more of RF transceiver circuitry 122, baseband processing circuitry 124, and application processing circuitry 126. In other embodiments, the processing circuitry may comprise different components and/or different combinations of components. In certain embodiments processing circuitry 120 of WD 110 may comprise a SOC. In some embodiments, RF transceiver circuitry 122, baseband processing circuitry 124, and application processing circuitry 126 may be on separate chips or sets of chips.

In alternative embodiments, part or all of baseband processing circuitry 124 and application processing circuitry 126 may be combined into one chip or set of chips, and RF transceiver circuitry 122 may be on a separate chip or set of chips. In still alternative embodiments, part or all of RF transceiver circuitry 122 and baseband processing circuitry 124 may be on the same chip or set of chips, and application processing circuitry 126 may be on a separate chip or set of chips. In yet other alternative embodiments, part or all of RF transceiver circuitry 122, baseband processing circuitry 124, and application processing circuitry 126 may be combined in the same chip or set of chips. In some embodiments, RF transceiver circuitry 122 may be a part of interface 114. RF transceiver circuitry 122 may condition RF signals for processing circuitry 120.

In certain embodiments, some or all of the functionality described herein as being performed by a WD may be provided by processing circuitry 120 executing instructions stored on device readable medium 130, which in certain embodiments may be a computer-readable storage medium. In alternative embodiments, some or all of the functionality may be provided by processing circuitry 120 without executing instructions stored on a separate or discrete device readable storage medium, such as in a hard-wired manner.

In any of those embodiments, whether executing instructions stored on a device readable storage medium or not, processing circuitry 120 can be configured to perform the described functionality. The benefits provided by such functionality are not limited to processing circuitry 120 alone or to other components of WD 110, but are enjoyed by WD 110, and/or by end users and the wireless network generally.

Processing circuitry 120 may be configured to perform any determining, calculating, or similar operations (e.g., certain obtaining operations) described herein as being performed by a WD. These operations, as performed by processing circuitry 120, may include processing information obtained by processing circuitry 120 by, for example, converting the obtained information into other information, comparing the obtained information or converted information to information stored by WD 110, and/or performing one or more operations based on the obtained information or converted information, and as a result of said processing making a determination.

Device readable medium 130 may be operable to store a computer program, software, an application including one or more of logic, rules, code, tables, etc. and/or other instructions capable of being executed by processing circuitry 120. Device readable medium 130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 120. In some embodiments, processing circuitry 120 and device readable medium 130 may be integrated.

User interface equipment 132 may provide components that allow for a human user to interact with WD 110. Such interaction may be of many forms, such as visual, audial, tactile, etc. User interface equipment 132 may be operable to produce output to the user and to allow the user to provide input to WD 110. The type of interaction may vary depending on the type of user interface equipment 132 installed in WD 110. For example, if WD 110 is a smart phone, the interaction may be via a touch screen; if WD 110 is a smart meter, the interaction may be through a screen that provides usage (e.g., the number of gallons used) or a speaker that provides an audible alert (e.g., if smoke is detected).

User interface equipment 132 may include input interfaces, devices and circuits, and output interfaces, devices and circuits. User interface equipment 132 is configured to allow input of information into WD 110 and is connected to processing circuitry 120 to allow processing circuitry 120 to process the input information. User interface equipment 132 may include, for example, a microphone, a proximity or other sensor, keys/buttons, a touch display, one or more cameras, a USB port, or other input circuitry. User interface equipment 132 is also configured to allow output of information from WD 110, and to allow processing circuitry 120 to output information from WD 110. User interface equipment 132 may include, for example, a speaker, a display, vibrating circuitry, a USB port, a headphone interface, or other output circuitry. Using one or more input and output interfaces, devices, and circuits, of user interface equipment 132, WD 110 may communicate with end users and/or the wireless network and allow them to benefit from the functionality described herein.

Auxiliary equipment 134 is operable to provide more specific functionality which may not be generally performed by WDs. This may comprise specialized sensors for doing measurements for various purposes, interfaces for additional types of communication such as wired communications etc. The inclusion and type of components of auxiliary equipment 134 may vary depending on the embodiment and/or scenario.

Power source 136 may, in some embodiments, be in the form of a battery or battery pack. Other types of power sources, such as an external power source (e.g., an electricity outlet), photovoltaic devices or power cells, may also be used. WD 110 may further comprise power circuitry 137 for delivering power from power source 136 to the various parts of WD 110 which need power from power source 136 to carry out any functionality described or indicated herein. Power circuitry 137 may in certain embodiments comprise power management circuitry.

Power circuitry 137 may additionally or alternatively be operable to receive power from an external power source; in which case WD 110 may be connectable to the external power source (such as an electricity outlet) via input circuitry or an interface such as an electrical power cable. Power circuitry 137 may also in certain embodiments be operable to deliver power from an external power source to power source 136. This may be, for example, for the charging of power source 136. Power circuitry 137 may perform any formatting, converting, or other modification to the power from power source 136 to make the power suitable for the respective components of WD 110 to which power is supplied.

Although the subject matter described herein may be implemented in any appropriate type of system using any suitable components, the embodiments disclosed herein are described in relation to a wireless network, such as the example wireless network illustrated in FIG. 18. For simplicity, the wireless network of FIG. 18 only depicts network 106, network nodes 160 and 160b, and WDs 110, 110b, and 110c. In practice, a wireless network may further include any additional elements suitable to support communication between wireless devices or between a wireless device and another communication device, such as a landline telephone, a service provider, or any other network node or end device. Of the illustrated components, network node 160 and wireless device (WD) 110 are depicted with additional detail. The wireless network may provide communication and other types of services to one or more wireless devices to facilitate the wireless devices' access to and/or use of the services provided by, or via, the wireless network.

Figure 19:
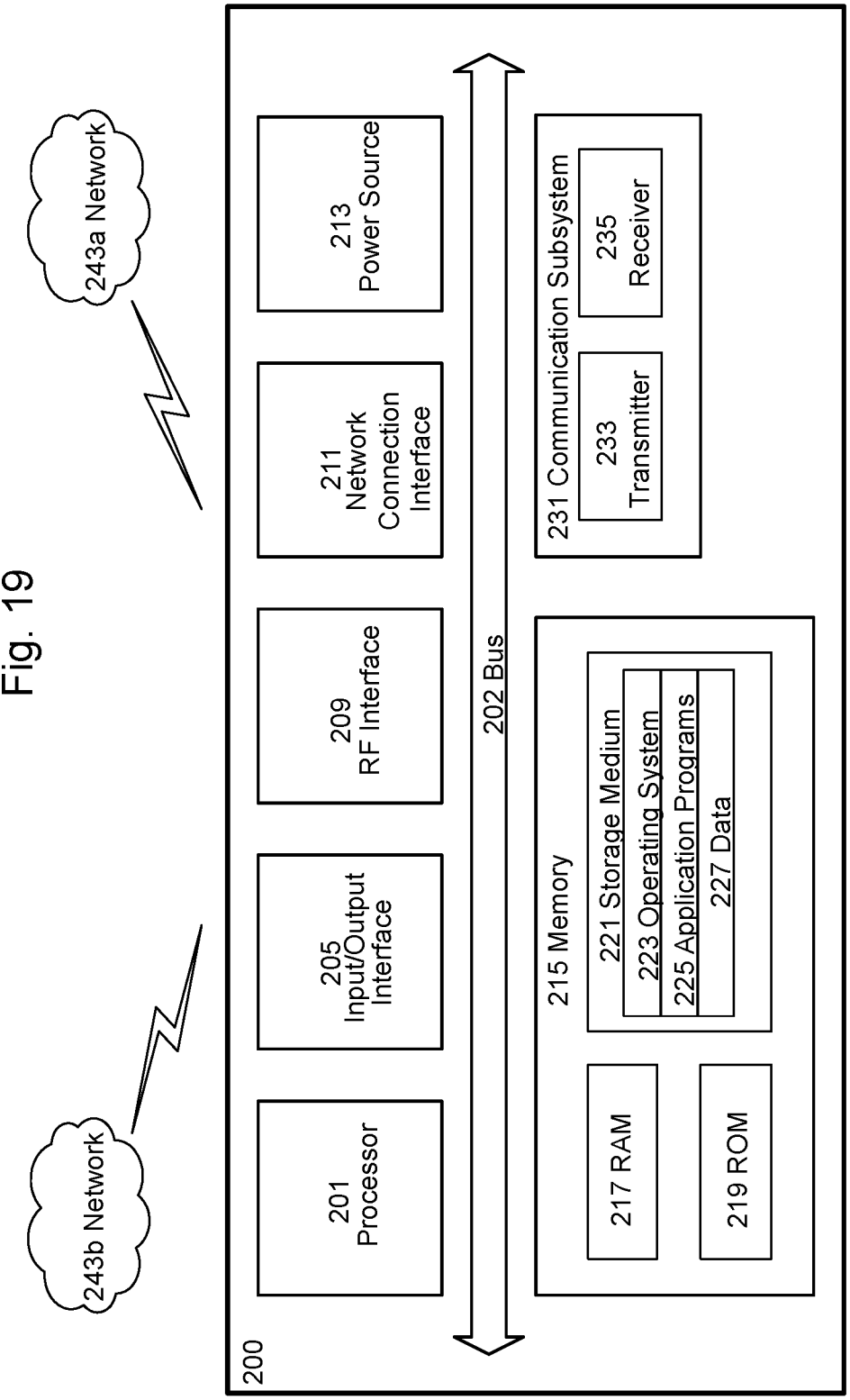
FIG. 19 illustrates an example user equipment, according to certain embodiments.

FIG. 19 illustrates an example user equipment, according to certain embodiments. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 200 may be any UE identified by the $3^{rd}$ Generation Partnership Project (3GPP), including a NB-IoT UE, a machine type communication (MTC) UE, and/or an enhanced MTC (eMTC) UE. UE 200, as illustrated in FIG. 19, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although FIG. 19 is a UE, the components discussed herein are equally applicable to a WD, and vice-versa.

In FIG. 19, UE 200 includes processing circuitry 201 that is operatively coupled to input/output interface 205, radio frequency (RF) interface 209, network connection interface 211, memory 215 including random access memory (RAM) 217, read-only memory (ROM) 219, and storage medium 221 or the like, communication subsystem 231, power source 213, and/or any other component, or any combination thereof. Storage medium 221 includes operating system 223, application program 225, and data 227. In other embodiments, storage medium 221 may include other similar types of information. Certain UEs may use all the components shown in FIG. 19, or only a subset of the components. The level of integration between the components may vary from one UE to another UE. Further, certain UEs may contain multiple instances of a component, such as multiple processors, memories, transceivers, transmitters, receivers, etc.

In FIG. 19, processing circuitry 201 may be configured to process computer instructions and data. Processing circuitry 201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 201 may include two central processing units (CPUs). Data may be information in a form suitable for use by a computer.

In the depicted embodiment, input/output interface 205 may be configured to provide a communication interface to an input device, output device, or input and output device. UE 200 may be configured to use an output device via input/output interface 205.

An output device may use the same type of interface port as an input device. For example, a USB port may be used to provide input to and output from UE 200. The output device may be a speaker, a sound card, a video card, a display, a monitor, a printer, an actuator, an emitter, a smartcard, another output device, or any combination thereof.

UE 200 may be configured to use an input device via input/output interface 205 to allow a user to capture information into UE 200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 19, RF interface 209 may be configured to provide a communication interface to RF components such as a transmitter, a receiver, and an antenna. Network connection interface 211 may be configured to provide a communication interface to network 243a. Network 243a may encompass wired and/or wireless networks such as a local-area network (LAN), a wide-area network (WAN), a computer network, a wireless network, a telecommunications network, another like network or any combination thereof. For example, network 243a may comprise a Wi-Fi network. Network connection interface 211 may be configured to include a receiver and a transmitter interface used to communicate with one or more other devices over a communication network according to one or more communication protocols, such as Ethernet, TCP/IP, SONET, ATM, or the like. Network connection interface 211 may implement receiver and transmitter functionality appropriate to the communication network links (e.g., optical, electrical, and the like). The transmitter and receiver functions may share circuit components, software or firmware, or alternatively may be implemented separately.

RAM 217 may be configured to interface via bus 202 to processing circuitry 201 to provide storage or caching of data or computer instructions during the execution of software programs such as the operating system, application programs, and device drivers. ROM 219 may be configured to provide computer instructions or data to processing circuitry 201. For example, ROM 219 may be configured to store invariant low-level system code or data for basic system functions such as basic input and output (I/O), startup, or reception of keystrokes from a keyboard that are stored in a non-volatile memory.

Storage medium 221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 221 may be configured to include operating system 223, application program 225 such as a web browser application, a widget or gadget engine or another application, and data file 227. Storage medium 221 may store, for use by UE 200, any of a variety of various operating systems or combinations of operating systems.

Storage medium 221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 221 may allow UE 200 to access computer-executable instructions, application programs or the like, stored on transitory or non-transitory memory media, to off-load data, or to upload data. An article of manufacture, such as one utilizing a communication system may be tangibly embodied in storage medium 221, which may comprise a device readable medium.

In FIG. 19, processing circuitry 201 may be configured to communicate with network 243b using communication subsystem 231. Network 243a and network 243b may be the same network or networks or different network or networks. Communication subsystem 231 may be configured to include one or more transceivers used to communicate with network 243b. For example, communication subsystem 231 may be configured to include one or more transceivers used to communicate with one or more remote transceivers of another device capable of wireless communication such as another WD, UE, or base station of a radio access network (RAN) according to one or more communication protocols, such as IEEE 802.2, CDMA, WCDMA, GSM, LTE, UTRAN, WiMax, or the like. Each transceiver may include transmitter 233 and/or receiver 235 to implement transmitter or receiver functionality, respectively, appropriate to the RAN links (e.g., frequency allocations and the like). Further, transmitter 233 and receiver 235 of each transceiver may share circuit components, software or firmware, or alternatively may be implemented separately.

In the illustrated embodiment, the communication functions of communication subsystem 231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 231 may include cellular communication, Wi-Fi communication, Bluetooth communication, and GPS communication. Network 243b may encompass wired and/or wireless networks such as a local-area network (LAN), a wide-area network (WAN), a computer network, a wireless network, a telecommunications network, another like network or any combination thereof. For example, network 243b may be a cellular network, a Wi-Fi network, and/or a near-field network. Power source 213 may be configured to provide alternating current (AC) or direct current (DC) power to components of UE 200.

The features, benefits and/or functions described herein may be implemented in one of the components of UE 200 or partitioned across multiple components of UE 200. Further, the features, benefits, and/or functions described herein may be implemented in any combination of hardware, software or firmware. In one example, communication subsystem 231 may be configured to include any of the components described herein. Further, processing circuitry 201 may be configured to communicate with any of such components over bus 202. In another example, any of such components may be represented by program instructions stored in memory that when executed by processing circuitry 201 perform the corresponding functions described herein. In another example, the functionality of any of such components may be partitioned between processing circuitry 201 and communication subsystem 231. In another example, the non-computationally intensive functions of any of such components may be implemented in software or firmware and the computationally intensive functions may be implemented in hardware.

Figure 20:
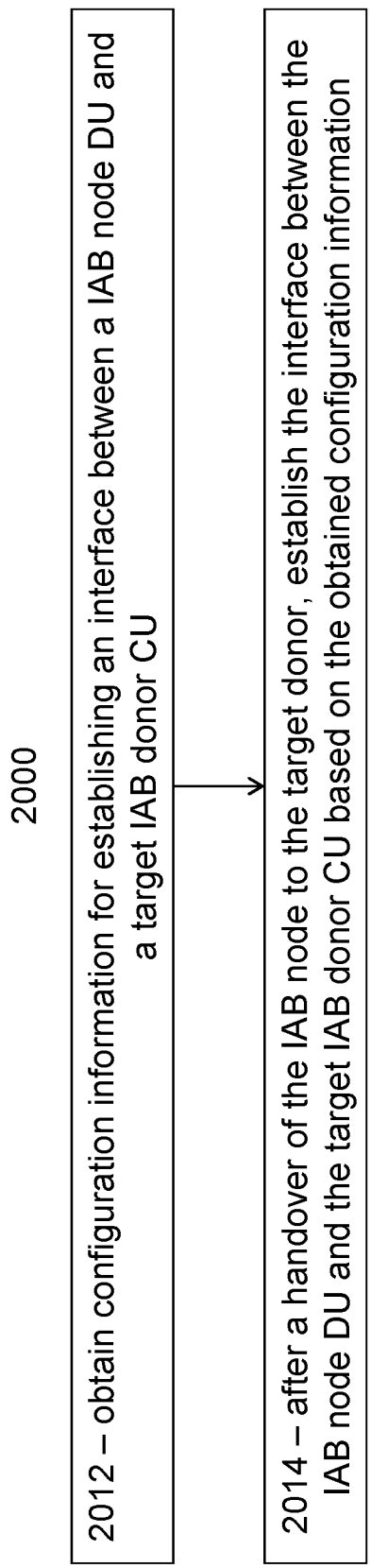
FIG. 20 is flowchart illustrating an example method in a network node operating an IAB node, according to certain embodiments.

FIG. 20 is a flowchart illustrating an example method in a network node, according to certain embodiments. In particular embodiments, one or more steps of FIG. 20 may be performed by network node 160 described with respect to FIG. 18. The network node comprises an IAB DU and MT.

The method begins at step 2012, where the network node (e.g., network node 160) obtains configuration information for establishing an interface between the IAB node DU and a target IAB donor central unit (CU). The interface may comprise an F1 interface, for example.

The configuration information may include a transport layer address (e.g., IP address) of the target IAB donor. The configuration information may include any of the information described herein as well as any other suitable information for establishing the connection. The information may be related control plane (e.g., CU-CP) or user plane (e.g., CU-UP). The configuration information may comprise a list of IAB donor CUs and associated configuration information for each IAB donor CU in the list of IAB donor CUs.

The network node may obtain the configuration information by receiving the configuration information from a source IAB donor CU. For example, the network node may receive the configuration information by receiving the configuration information from a source IAB donor CU, or may receive the configuration information from a source IAB donor CU by receiving a RRC message at the IAB node MT.

In some embodiments, the network node obtains configuration information by receiving a handover command that includes the configuration information. In some embodiments, the network node may obtain the configuration information from an OAM system. The network node may obtain the configuration information before, during, or after a handover procedure.

The network node may obtain the configuration information according to any of the embodiments and examples described herein. An example is illustrated in FIG. 14.

At step 2014, after a handover of the IAB node to the target donor, the network node establishes the interface between the IAB node DU and the target IAB donor CU based on the obtained configuration information. For example, the network node may send an F1 Setup request to the IP address of the target IAB donor.

In some embodiments, the network node initiates establishing the interface on its own. An example is illustrated in FIG. 14. In some embodiments, the network node receives an indication from the target IAB donor to establish the interface. An example is illustrated in FIG. 15. The network node may establish the interface according to any of the embodiments and examples described herein.

Modifications, additions, or omissions may be made to method 2000 of FIG. 20. Additionally, one or more steps in the method of FIG. 20 may be performed in parallel or in any suitable order.

Figure 21A:
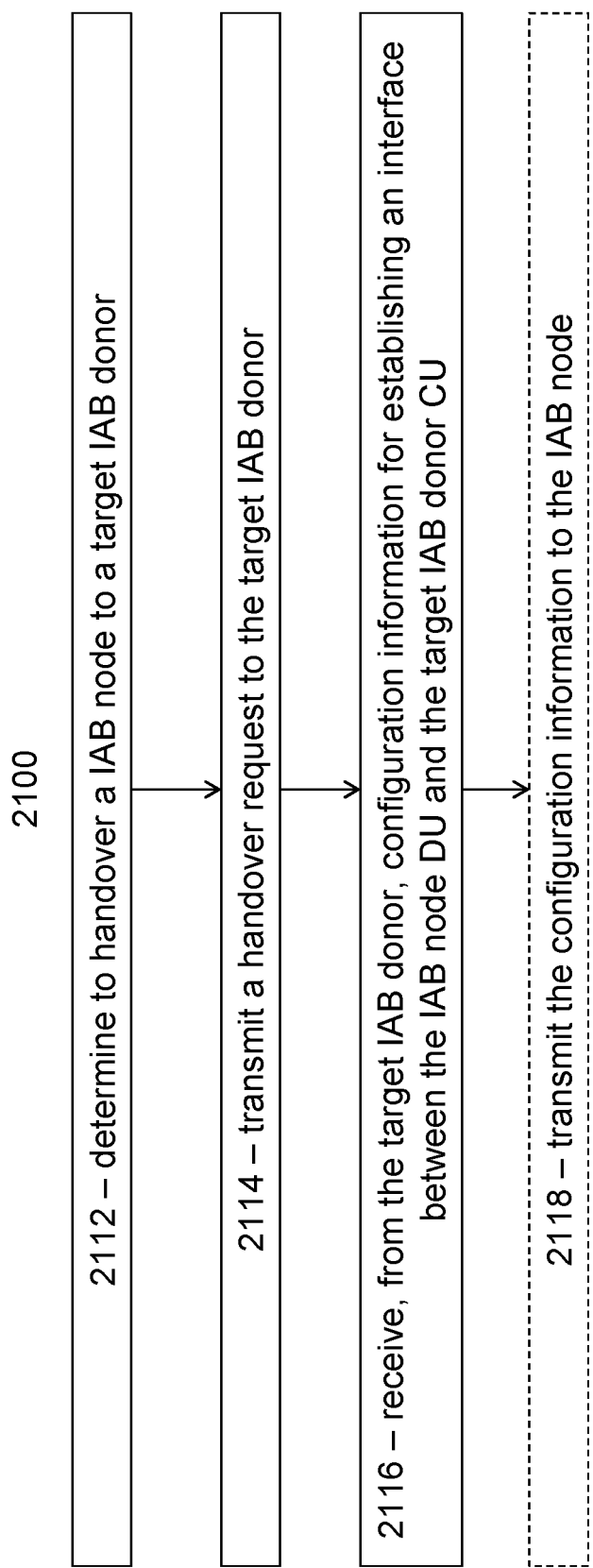
FIG. 21A is a flowchart illustrating an example method in a network node operating as a source IAB donor, according to certain embodiments.

FIG. 21A is a flowchart illustrating an example method in a network node, according to certain embodiments. In particular embodiments, one or more steps of FIG. 21A may be performed by network node 160 described with respect to FIG. 18. The network node comprises a source IAB donor.

The method begins at step 2112, where the network node (e.g., network node 160) determines to handover a IAB node to a target IAB donor. The IAB node comprises a DU and a MT and the target IAB donor comprises a CU.

At step 2114, the network node transmits a handover request to the target IAB donor. An example is illustrated in FIG. 14.

At step 2116, the network node receives, from the target IAB donor, configuration information for establishing an interface between the IAB node DU and the target IAB donor CU. The configuration information is described with respect to step 2012 of FIG. 20. An example is illustrated in FIG. 14.

At step 2118, the network node may transmit the configuration information to the IAB node. The network node may transmit the configuration information as described with respect to step 2012 of FIG. 20. An example is illustrated in FIG. 14.

Modifications, additions, or omissions may be made to method 2100 of FIG. 21A. Additionally, one or more steps in the method of FIG. 21A may be performed in parallel or in any suitable order.

Figure 21B:
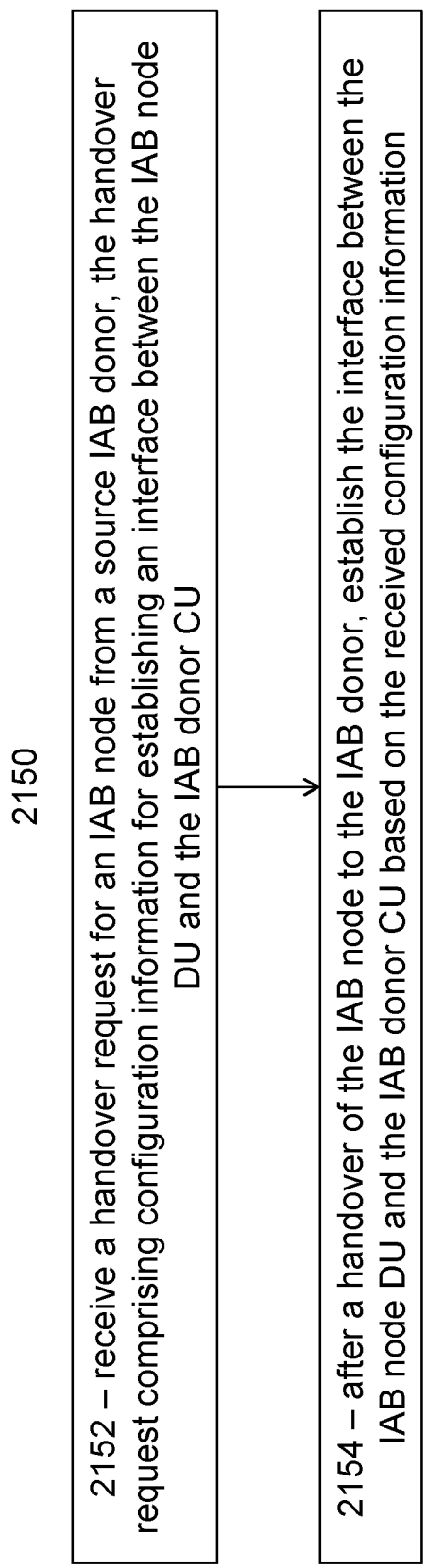
FIG. 21B is a flowchart illustrating another example method in a network node operating as a target IAB donor, according to certain embodiments.

FIG. 21B is a flowchart illustrating another example method in a network node, according to certain embodiments. In particular embodiments, one or more steps of FIG. 21B may be performed by network node 160 described with respect to FIG. 18. The network node comprises a target IAB donor.

The method begins at step 2152, where the network node (e.g., network node 160) receives a handover request for an IAB node from a source IAB donor. The handover request comprising configuration information for establishing an interface between the IAB node DU and the IAB donor CU.

The configuration information is described with respect to step 2012 of FIG. 20. In some embodiments, the configuration information may include F1 context information.

At step 2014, after a handover of the IAB node to the IAB donor, the network node establishes the interface between the IAB node DU and the IAB donor CU based on the received configuration information.

For example, the network node knows the IP address of the IAB node and may send a setup request to the IAB node. An example is illustrated in FIG. 15. The network node may send an indication to the IAB node for the IAB node to establish the interface.

In some embodiments, the configuration information comprises an interface context for an interface between the IAB node DU and the source IAB donor CU. The network node establishes the interface by sending a setup response to the IAB node. The setup response is based on the received interface context. Thus, the target IAB donor sends setup response without ever having to wait for a setup request from the IAB node. Examples are illustrated in FIGS. 16 and 17.

Modifications, additions, or omissions may be made to method 2150 of FIG. 21B. Additionally, one or more steps in the method of FIG. 21B may be performed in parallel or in any suitable order.

Figure 22:
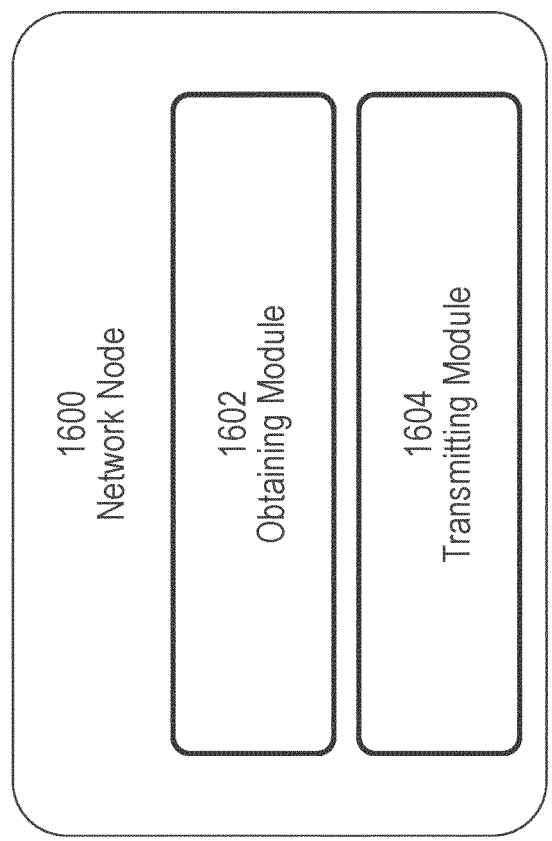
FIG. 22 illustrates a schematic block diagram of a network node in a wireless network, according to certain embodiments.

FIG. 22 illustrates a schematic block diagram of an apparatus in a wireless network (for example, the wireless network illustrated in FIG. 18). The apparatus may comprise a network node (e.g., network node 160 in FIG. 18). Apparatus 1600 is operable to carry out the example methods described with reference to FIGS. 20, 21A and 21B. Apparatus 1600 may be operable to carry out other processes or methods disclosed herein. It is also to be understood that the methods of FIGS. 20, 21A and 21B are not necessarily carried out solely by apparatus 1600. At least some operations of the method can be performed by one or more other entities.

Virtual apparatus 1600 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments.

In some implementations, the processing circuitry may be used to cause obtaining module 1602, transmitting module 1604, and any other suitable units of apparatus 1600 to perform corresponding functions according one or more embodiments of the present disclosure.

As illustrated in FIG. 22, apparatus 1600 includes obtaining module 1602 configured to obtain interface configuration information according to any of the embodiments and examples described herein. Transmitting module 1604 is configured to transmit interface configuration information, handover messages, and setup/remove messages according to any of the embodiments and examples described herein.

Figure 23:
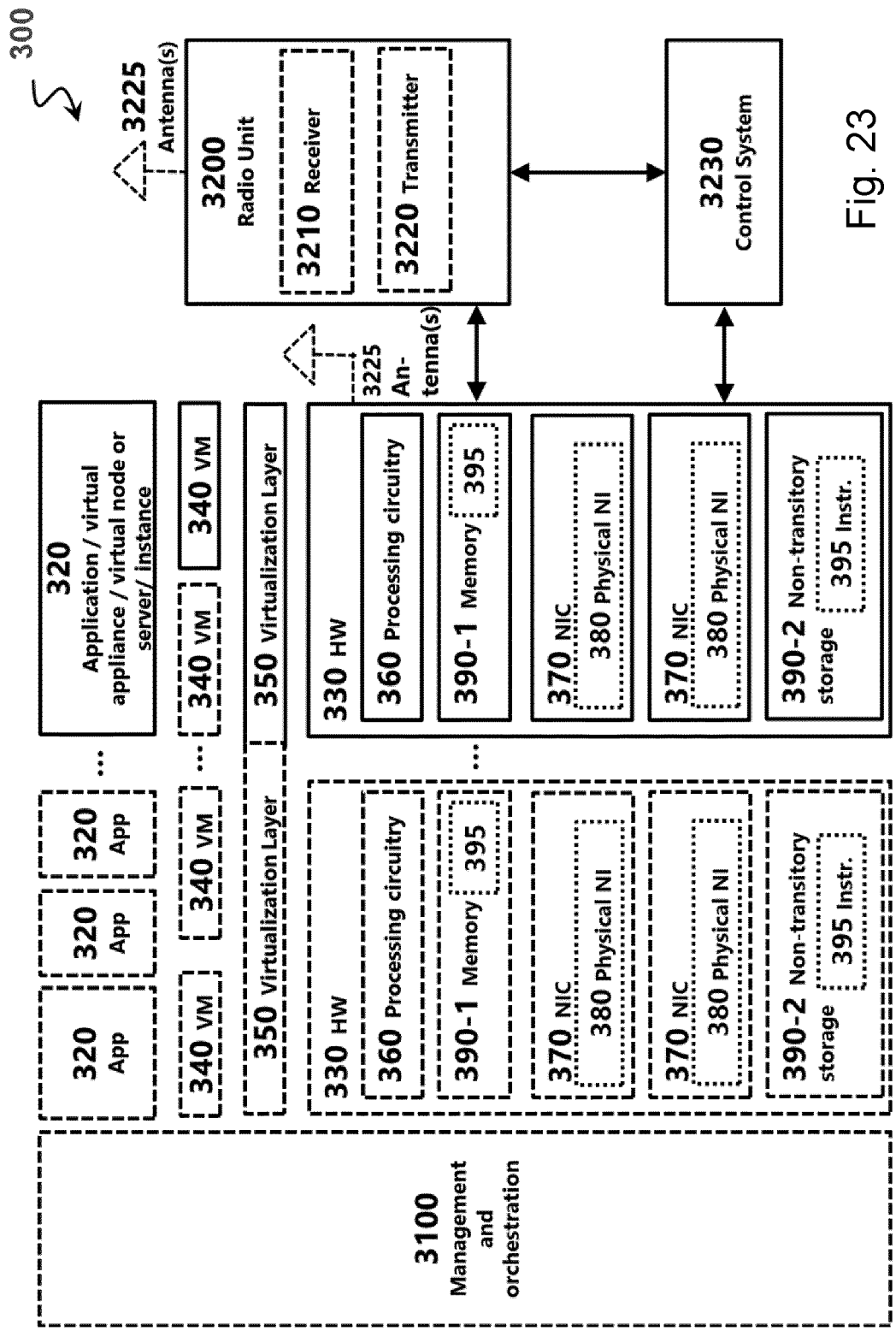
FIG. 23 illustrates an example virtualization environment, according to certain embodiments.

FIG. 23 is a schematic block diagram illustrating a virtualization environment 300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 300 hosted by one or more of hardware nodes 330. Further, in embodiments in which the virtual node is not a radio access node or does not require radio connectivity (e.g., a core network node), then the network node may be entirely virtualized.

The functions may be implemented by one or more applications 320 (which may alternatively be called software instances, virtual appliances, network functions, virtual nodes, virtual network functions, etc.) operative to implement some of the features, functions, and/or benefits of some of the embodiments disclosed herein. Applications 320 are run in virtualization environment 300 which provides hardware 330 comprising processing circuitry 360 and memory 390. Memory 390 contains instructions 395 executable by processing circuitry 360 whereby application 320 is operative to provide one or more of the features, benefits, and/or functions disclosed herein.

Virtualization environment 300, comprises general-purpose or special-purpose network hardware devices 330 comprising a set of one or more processors or processing circuitry 360, which may be commercial off-the-shelf (COTS) processors, dedicated Application Specific Integrated Circuits (ASICs), or any other type of processing circuitry including digital or analog hardware components or special purpose processors. Each hardware device may comprise memory 390-1 which may be non-persistent memory for temporarily storing instructions 395 or software executed by processing circuitry 360. Each hardware device may comprise one or more network interface controllers (NICs) 370, also known as network interface cards, which include physical network interface 380. Each hardware device may also include non-transitory, persistent, machine-readable storage media 390-2 having stored therein software 395 and/or instructions executable by processing circuitry 360. Software 395 may include any type of software including software for instantiating one or more virtualization layers 350 (also referred to as hypervisors), software to execute virtual machines 340 as well as software allowing it to execute functions, features and/or benefits described in relation with some embodiments described herein.

Virtual machines 340, comprise virtual processing, virtual memory, virtual networking or interface and virtual storage, and may be run by a corresponding virtualization layer 350 or hypervisor. Different embodiments of the instance of virtual appliance 320 may be implemented on one or more of virtual machines 340, and the implementations may be made in different ways.

During operation, processing circuitry 360 executes software 395 to instantiate the hypervisor or virtualization layer 350, which may sometimes be referred to as a virtual machine monitor (VMM). Virtualization layer 350 may present a virtual operating platform that appears like networking hardware to virtual machine 340.

As shown in FIG. 23, hardware 330 may be a standalone network node with generic or specific components. Hardware 330 may comprise antenna 3225 and may implement some functions via virtualization. Alternatively, hardware 330 may be part of a larger cluster of hardware (e.g. such as in a data center or customer premise equipment (CPE)) where many hardware nodes work together and are managed via management and orchestration (MANO) 3100, which, among others, oversees lifecycle management of applications 320.

Virtualization of the hardware is in some contexts referred to as network function virtualization (NFV). NFV may be used to consolidate many network equipment types onto industry standard high-volume server hardware, physical switches, and physical storage, which can be located in data centers, and customer premise equipment.

In the context of NFV, virtual machine 340 may be a software implementation of a physical machine that runs programs as if they were executing on a physical, non-virtualized machine. Each of virtual machines 340, and that part of hardware 330 that executes that virtual machine, be it hardware dedicated to that virtual machine and/or hardware shared by that virtual machine with others of the virtual machines 340, forms a separate virtual network elements (VNE).

Still in the context of NFV, Virtual Network Function (VNF) is responsible for handling specific network functions that run in one or more virtual machines 340 on top of hardware networking infrastructure 330 and corresponds to application 320 in FIG. 18.

In some embodiments, one or more radio units 3200 that each include one or more transmitters 3220 and one or more receivers 3210 may be coupled to one or more antennas 3225. Radio units 3200 may communicate directly with hardware nodes 330 via one or more appropriate network interfaces and may be used in combination with the virtual components to provide a virtual node with radio capabilities, such as a radio access node or a base station.

In some embodiments, some signaling can be effected with the use of control system 3230 which may alternatively be used for communication between the hardware nodes 330 and radio units 3200.

Figure 24:
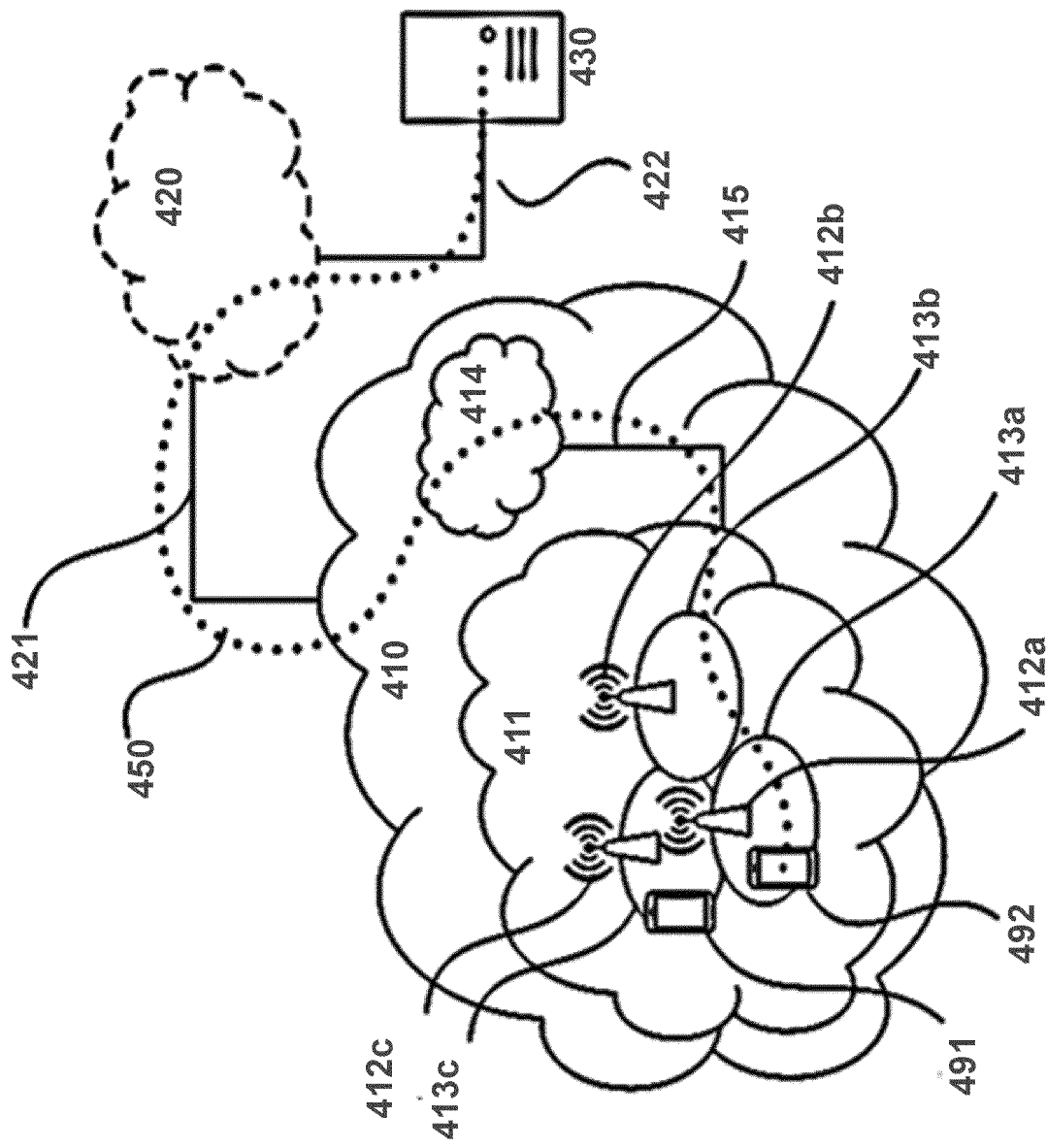
FIG. 24 illustrates an example telecommunication network connected via an intermediate network to a host computer, according to certain embodiments.

With reference to FIG. 24, in accordance with an embodiment, a communication system includes telecommunication network 410, such as a 3GPP-type cellular network, which comprises access network 411, such as a radio access network, and core network 414. Access network 411 comprises a plurality of base stations 412a, 412b, 412c, such as NBs, eNBs, gNBs or other types of wireless access points, each defining a corresponding coverage area 413a, 413b, 413c. Each base station 412a, 412b, 412c is connectable to core network 414 over a wired or wireless connection 415. A first UE 491 located in coverage area 413c is configured to wirelessly connect to, or be paged by, the corresponding base station 412c. A second UE 492 in coverage area 413a is wirelessly connectable to the corresponding base station 412a. While a plurality of UEs 491, 492 are illustrated in this example, the disclosed embodiments are equally applicable to a situation where a sole UE is in the coverage area or where a sole UE is connecting to the corresponding base station 412.

Telecommunication network 410 is itself connected to host computer 430, which may be embodied in the hardware and/or software of a standalone server, a cloud-implemented server, a distributed server or as processing resources in a server farm. Host computer 430 may be under the ownership or control of a service provider or may be operated by the service provider or on behalf of the service provider. Connections 421 and 422 between telecommunication network 410 and host computer 430 may extend directly from core network 414 to host computer 430 or may go via an optional intermediate network 420. Intermediate network 420 may be one of, or a combination of more than one of, a public, private or hosted network; intermediate network 420, if any, may be a backbone network or the Internet; in particular, intermediate network 420 may comprise two or more sub-networks (not shown).

The communication system of FIG. 24 as a whole enables connectivity between the connected UEs 491, 492 and host computer 430. The connectivity may be described as an over-the-top (OTT) connection 450. Host computer 430 and the connected UEs 491, 492 are configured to communicate data and/or signaling via OTT connection 450, using access network 411, core network 414, any intermediate network 420 and possible further infrastructure (not shown) as intermediaries. OTT connection 450 may be transparent in the sense that the participating communication devices through which OTT connection 450 passes are unaware of routing of uplink and downlink communications. For example, base station 412 may not or need not be informed about the past routing of an incoming downlink communication with data originating from host computer 430 to be forwarded (e.g., handed over) to a connected UE 491. Similarly, base station 412 need not be aware of the future routing of an outgoing uplink communication originating from the UE 491 towards the host computer 430.

Figure 25:
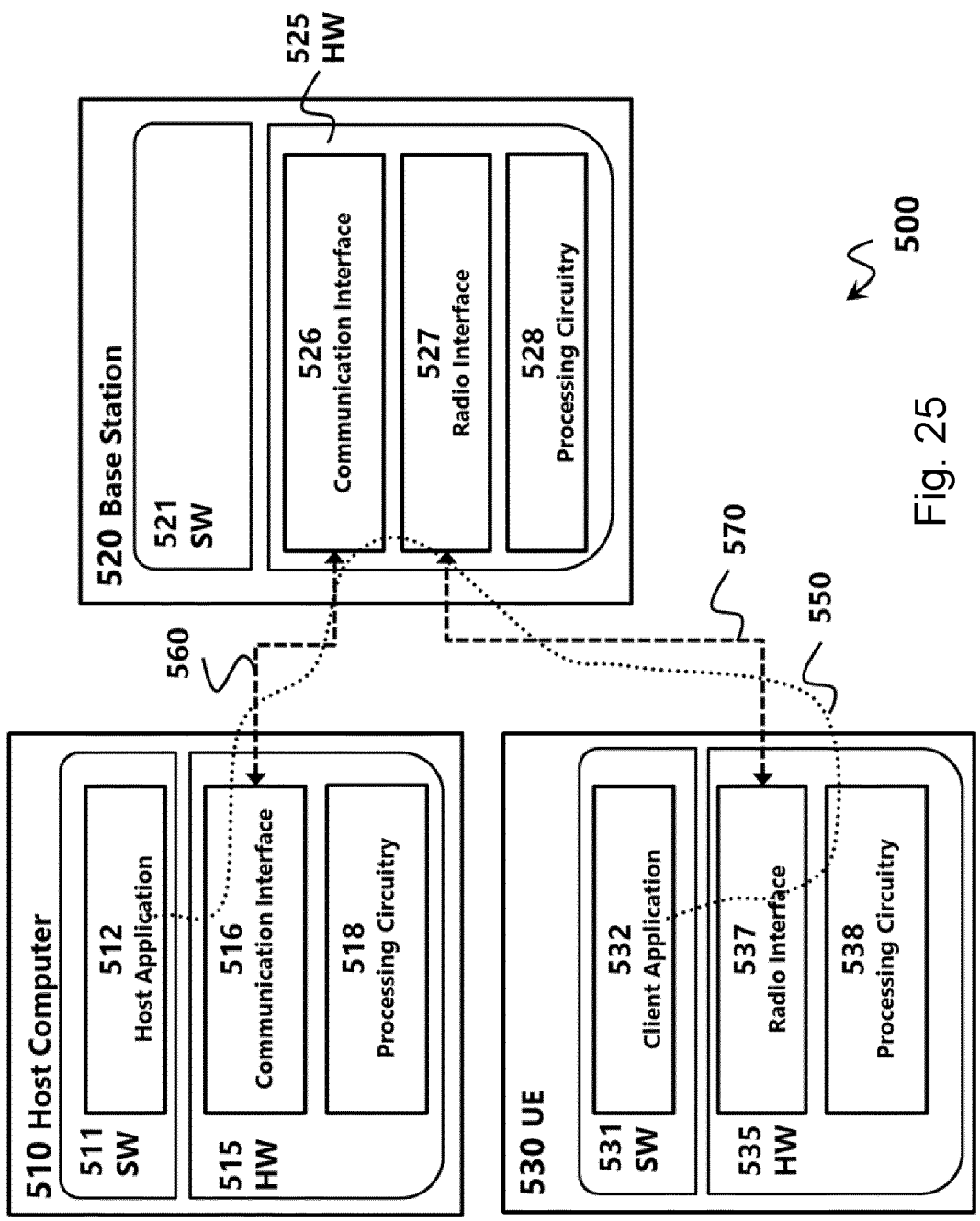
FIG. 25 illustrates an example host computer communicating via a base station with a user equipment over a partially wireless connection, according to certain embodiments.

FIG. 25 illustrates an example host computer communicating via a base station with a user equipment over a partially wireless connection, according to certain embodiments. Example implementations, in accordance with an embodiment of the UE, base station and host computer discussed in the preceding paragraphs will now be described with reference to FIG. 25. In communication system 500, host computer 510 comprises hardware 515 including communication interface 516 configured to set up and maintain a wired or wireless connection with an interface of a different communication device of communication system 500. Host computer 510 further comprises processing circuitry 518, which may have storage and/or processing capabilities. In particular, processing circuitry 518 may comprise one or more programmable processors, application-specific integrated circuits, field programmable gate arrays or combinations of these (not shown) adapted to execute instructions. Host computer 510 further comprises software 511, which is stored in or accessible by host computer 510 and executable by processing circuitry 518. Software 511 includes host application 512. Host application 512 may be operable to provide a service to a remote user, such as UE 530 connecting via OTT connection 550 terminating at UE 530 and host computer 510. In providing the service to the remote user, host application 512 may provide user data which is transmitted using OTT connection 550.

Communication system 500 further includes base station 520 provided in a telecommunication system and comprising hardware 525 enabling it to communicate with host computer 510 and with UE 530. Hardware 525 may include communication interface 526 for setting up and maintaining a wired or wireless connection with an interface of a different communication device of communication system 500, as well as radio interface 527 for setting up and maintaining at least wireless connection 570 with UE 530 located in a coverage area (not shown in FIG. 25) served by base station 520. Communication interface 526 may be configured to facilitate connection 560 to host computer 510. Connection 560 may be direct, or it may pass through a core network (not shown in FIG. 25) of the telecommunication system and/or through one or more intermediate networks outside the telecommunication system. In the embodiment shown, hardware 525 of base station 520 further includes processing circuitry 528, which may comprise one or more programmable processors, application-specific integrated circuits, field programmable gate arrays or combinations of these (not shown) adapted to execute instructions. Base station 520 further has software 521 stored internally or accessible via an external connection.

Communication system 500 further includes UE 530 already referred to. Its hardware 535 may include radio interface 537 configured to set up and maintain wireless connection 570 with a base station serving a coverage area in which UE 530 is currently located. Hardware 535 of UE 530 further includes processing circuitry 538, which may comprise one or more programmable processors, application-specific integrated circuits, field programmable gate arrays or combinations of these (not shown) adapted to execute instructions. UE 530 further comprises software 531, which is stored in or accessible by UE 530 and executable by processing circuitry 538. Software 531 includes client application 532. Client application 532 may be operable to provide a service to a human or non-human user via UE 530, with the support of host computer 510. In host computer 510, an executing host application 512 may communicate with the executing client application 532 via OTT connection 550 terminating at UE 530 and host computer 510. In providing the service to the user, client application 532 may receive request data from host application 512 and provide user data in response to the request data. OTT connection 550 may transfer both the request data and the user data. Client application 532 may interact with the user to generate the user data that it provides.

It is noted that host computer 510, base station 520 and UE 530 illustrated in FIG. 25 may be similar or identical to host computer 430, one of base stations 412*a*, 412*b*, 412*c* and one of UEs 491, 492 of FIG. 24, respectively. This is to say, the inner workings of these entities may be as shown in FIG. 25 and independently, the surrounding network topology may be that of FIG. 24.

In FIG. 25, OTT connection 550 has been drawn abstractly to illustrate the communication between host computer 510 and UE 530 via base station 520, without explicit reference to any intermediary devices and the precise routing of messages via these devices. Network infrastructure may determine the routing, which it may be configured to hide from UE 530 or from the service provider operating host computer 510, or both. While OTT connection 550 is active, the network infrastructure may further take decisions by which it dynamically changes the routing (e.g., based on load balancing consideration or reconfiguration of the network).

Wireless connection 570 between UE 530 and base station 520 is in accordance with the teachings of the embodiments described throughout this disclosure. One or more of the various embodiments improve the performance of OTT services provided to UE 530 using OTT connection 550, in which wireless connection 570 forms the last segment. More precisely, the teachings of these embodiments may improve the signaling overhead and reduce latency, which may provide faster internet access for users.

A measurement procedure may be provided for monitoring data rate, latency and other factors on which the one or more embodiments improve. There may further be an optional network functionality for reconfiguring OTT connection 550 between host computer 510 and UE 530, in response to variations in the measurement results. The measurement procedure and/or the network functionality for reconfiguring OTT connection 550 may be implemented in software 511 and hardware 515 of host computer 510 or in software 531 and hardware 535 of UE 530, or both. In embodiments, sensors (not shown) may be deployed in or in association with communication devices through which OTT connection 550 passes; the sensors may participate in the measurement procedure by supplying values of the monitored quantities exemplified above or supplying values of other physical quantities from which software 511, 531 may compute or estimate the monitored quantities. The reconfiguring of OTT connection 550 may include message format, retransmission settings, preferred routing etc.; the reconfiguring need not affect base station 520, and it may be unknown or imperceptible to base station 520. Such procedures and functionalities may be known and practiced in the art. In certain embodiments, measurements may involve proprietary UE signaling facilitating host computer 510's measurements of throughput, propagation times, latency and the like. The measurements may be implemented in that software 511 and 531 causes messages to be transmitted, in particular empty or 'dummy' messages, using OTT connection 550 while it monitors propagation times, errors etc.

Figure 26:
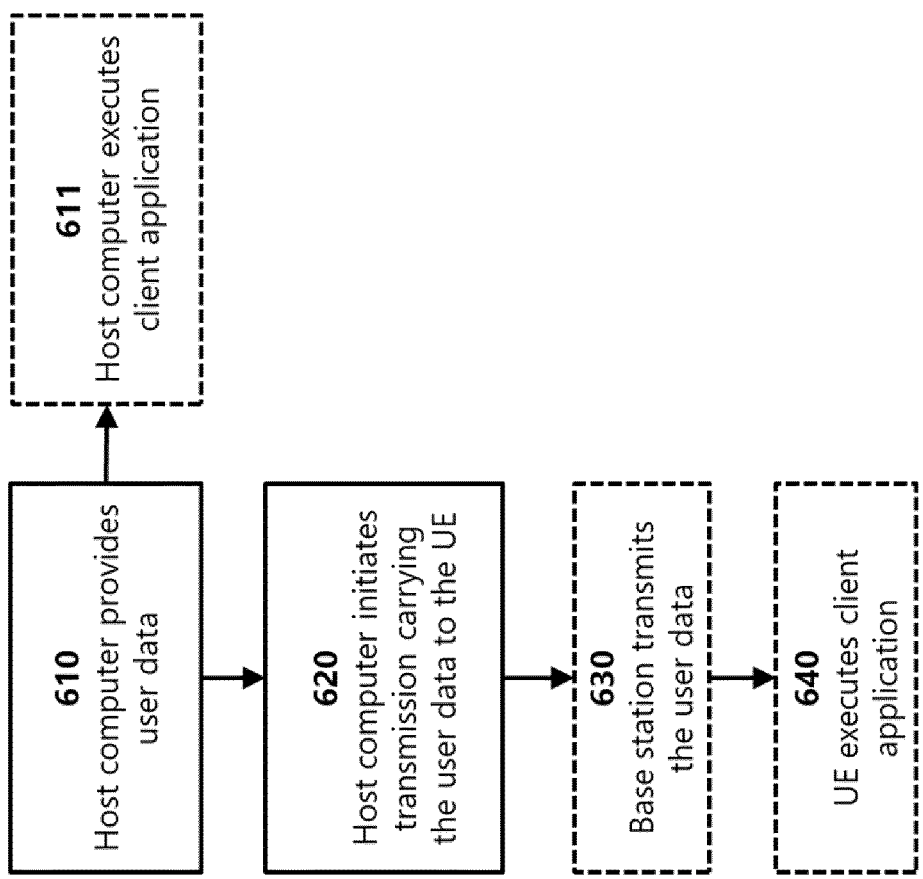
FIG. 26 is a flowchart illustrating a method implemented, according to certain embodiments.

FIG. 26 is a flowchart illustrating a method implemented in a communication system, in accordance with one embodiment. The communication system includes a host computer, a base station and a UE which may be those described with reference to FIGS. 24 and 25. For simplicity of the present disclosure, only drawing references to FIG. 26 will be included in this section.

In step 610, the host computer provides user data. In substep 611 (which may be optional) of step 610, the host computer provides the user data by executing a host application. In step 620, the host computer initiates a transmission carrying the user data to the UE. In step 630 (which may be optional), the base station transmits to the UE the user data which was carried in the transmission that the host computer initiated, in accordance with the teachings of the embodiments described throughout this disclosure. In step 640 (which may also be optional), the UE executes a client application associated with the host application executed by the host computer.

Figure 27:
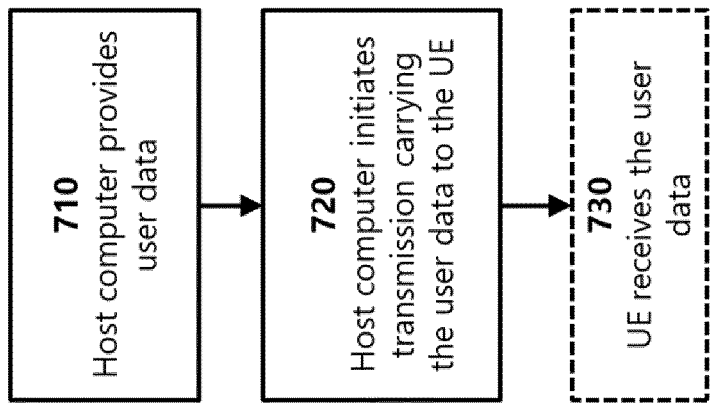
FIG. 27 is a flowchart illustrating a method implemented in a communication system, according to certain embodiments.

FIG. 27 is a flowchart illustrating a method implemented in a communication system, in accordance with one embodiment. The communication system includes a host computer, a base station and a UE which may be those described with reference to FIGS. 24 and 25. For simplicity of the present disclosure, only drawing references to FIG. 27 will be included in this section.

In step 710 of the method, the host computer provides user data. In an optional substep (not shown) the host computer provides the user data by executing a host application. In step 720, the host computer initiates a transmission carrying the user data to the UE. The transmission may pass via the base station, in accordance with the teachings of the embodiments described throughout this disclosure. In step 730 (which may be optional), the UE receives the user data carried in the transmission.

Figure 28:
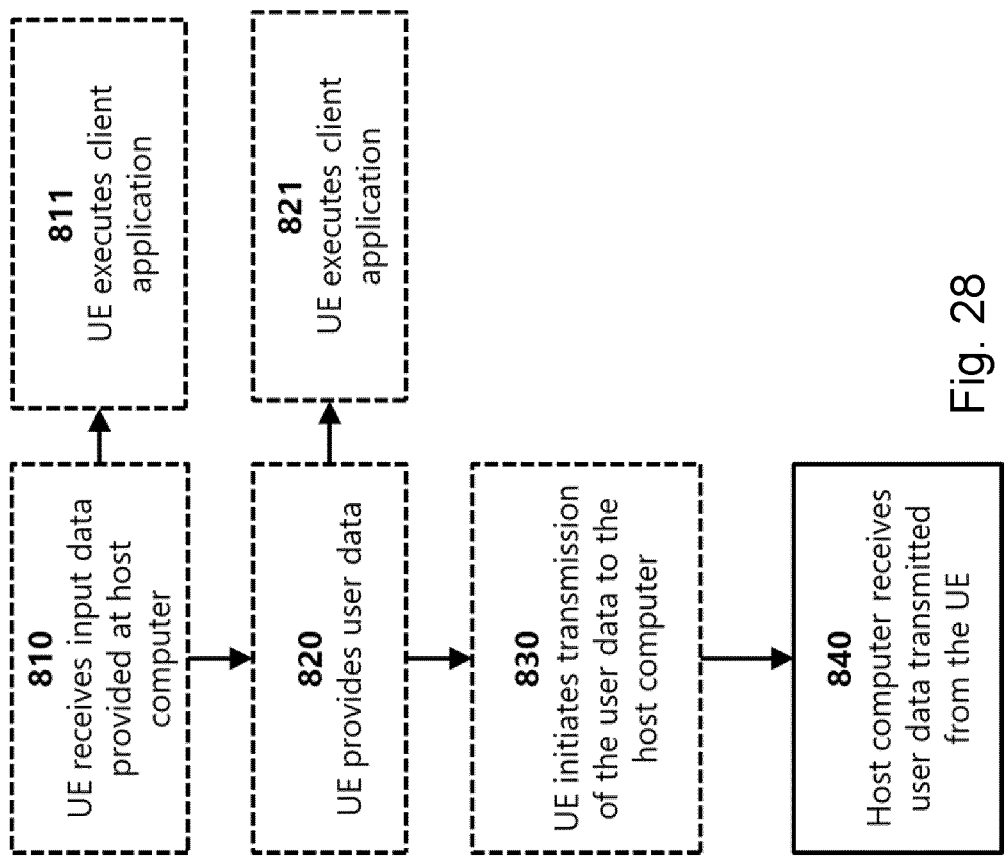
FIG. 28 is a flowchart illustrating a method implemented in a communication system, according to certain embodiments.

FIG. 28 is a flowchart illustrating a method implemented in a communication system, in accordance with one embodiment. The communication system includes a host computer, a base station and a UE which may be those described with reference to FIGS. 24 and 25. For simplicity of the present disclosure, only drawing references to FIG. 28 will be included in this section.

In step 810 (which may be optional), the UE receives input data provided by the host computer. Additionally, or alternatively, in step 820, the UE provides user data. In substep 821 (which may be optional) of step 820, the UE provides the user data by executing a client application. In substep 811 (which may be optional) of step 810, the UE executes a client application which provides the user data in reaction to the received input data provided by the host computer. In providing the user data, the executed client application may further consider user input received from the user. Regardless of the specific manner in which the user data was provided, the UE initiates, in substep 830 (which may be optional), transmission of the user data to the host computer. In step 840 of the method, the host computer receives the user data transmitted from the UE, in accordance with the teachings of the embodiments described throughout this disclosure.

Figure 29:
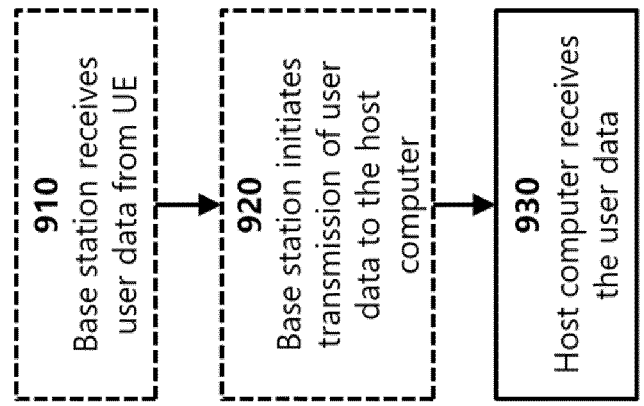
FIG. 29 is a flowchart illustrating a method implemented in a communication system, according to certain embodiments.

FIG. 29 is a flowchart illustrating a method implemented in a communication system, in accordance with one embodiment. The communication system includes a host computer, a base station and a UE which may be those described with reference to FIGS. 24 and 25. For simplicity of the present disclosure, only drawing references to FIG. 29 will be included in this section.

In step 910 (which may be optional), in accordance with the teachings of the embodiments described throughout this disclosure, the base station receives user data from the UE. In step 920 (which may be optional), the base station initiates transmission of the received user data to the host computer. In step 930 (which may be optional), the host computer receives the user data carried in the transmission initiated by the base station.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Modifications, additions, or omissions may be made to the systems and apparatuses disclosed herein without departing from the scope of the invention. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods disclosed herein without departing from the scope of the invention. The methods may include more, fewer, or other steps. Additionally, steps may be performed in any suitable order.

The foregoing description sets forth numerous specific details. It is understood, however, that embodiments may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments, whether or not explicitly described.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the scope of this disclosure, as defined by the claims below.

At least some of the following abbreviations may be used in this disclosure. If there is an inconsistency between abbreviations, preference should be given to how it is used above. If listed multiple times below, the first listing should be preferred over any subsequent listing(s).

1×RTT CDMA2000 1× Radio Transmission Technology
3GPP 3rd Generation Partnership Project
5G 5th Generation
ABS Almost Blank Subframe
ARQ Automatic Repeat Request
AWGN Additive White Gaussian Noise
BCCH Broadcast Control Channel
BCH Broadcast Channel
CA Carrier Aggregation
CC Carrier Component
CCCH SDU Common Control Channel SDU
CDMA Code Division Multiplexing Access
CGI Cell Global Identifier
CP Control Plane
CPICH Common Pilot Channel
CQI Channel Quality information
C-RNTI Cell RNTI
CSI Channel State Information
CU Central Unit
DC Dual Connectivity
DCCH Dedicated Control Channel
DL Downlink
DU Distributed Unit
E-CID Enhanced Cell-ID (positioning method)
E-SMLC Evolved-Serving Mobile Location Centre
ECGI Evolved CGI
eNB E-UTRAN NodeB
ePDCCH enhanced Physical Downlink Control Channel
E-SMLC evolved Serving Mobile Location Center
E-UTRA Evolved UTRA
E-UTRAN Evolved UTRAN
FDD Frequency Division Duplex
GERAN GSM EDGE Radio Access Network
gNB Base station in NR
GNSS Global Navigation Satellite System
GPS Global Positioning System
GSM Global System for Mobile communication
HARQ Hybrid Automatic Repeat Request
HO Handover
HSPA High Speed Packet Access
HRPD High Rate Packet Data
IAB Integrated Access and Backhaul
LTE Long-Term Evolution
MAC Medium Access Control
MBMS Multimedia Broadcast Multicast Services
MBSFN Multimedia Broadcast multicast service Single Frequency Network
MBSFN ABS MBSFN Almost Blank Subframe
MIB Master Information Block
MME Mobility Management Entity
MSC Mobile Switching Center
NR New Radio
OFDM Orthogonal Frequency Division Multiplexing
OFDMA Orthogonal Frequency Division Multiple Access
PBCH Physical Broadcast Channel
P-CCPCH Primary Common Control Physical Channel
PCell Primary Cell
PCFICH Physical Control Format Indicator Channel
PDCCH Physical Downlink Control Channel
PDSCH Physical Downlink Shared Channel PGW Packet Gateway
PHICH Physical Hybrid-ARQ Indicator Channel
PLMN Public Land Mobile Network
PRACH Physical Random Access Channel
PSS Primary Synchronization Signal
PUCCH Physical Uplink Control Channel
PUSCH Physical Uplink Shared Channel
RA Random Access
RACH Random Access Channel
QAM Quadrature Amplitude Modulation
RAN Radio Access Network
RAT Radio Access Technology
RLM Radio Link Management
RNC Radio Network Controller
RNTI Radio Network Temporary Identifier
RRC Radio Resource Control
RRM Radio Resource Management
RS Reference Signal
RSCP Received Signal Code Power
RSRP Reference Symbol Received Power OR Reference Signal Received Power
RSRQ Reference Signal Received Quality OR Reference Symbol Received Quality
RSSI Received Signal Strength Indicator
RSTD Reference Signal Time Difference
SCH Synchronization Channel
SCell Secondary Cell
SDU Service Data Unit
SFN System Frame Number
SGW Serving Gateway
SI System Information
SIB System Information Block
SNR Signal to Noise Ratio
SS Synchronization Signal
SSS Secondary Synchronization Signal
TDD Time Division Duplex
TTI Transmission Time Interval
UE User Equipment
UL Uplink
UMTS Universal Mobile Telecommunication System
UP User Plane
USIM Universal Subscriber Identity Module
UTRA Universal Terrestrial Radio Access
UTRAN Universal Terrestrial Radio Access Network
WCDMA Wide CDMA
WLAN Wide Local Area Network

The invention claimed is:

1. A method performed by a network node capable of operating as an integrated access and backhaul (IAB) node comprising a distributed unit (DU) and a mobile termination (MT), the method comprising:
    obtaining configuration information for establishing an interface between the IAB node DU and a target IAB donor central unit (CU), wherein the configuration information comprises a list of IAB donor CUs and associated configuration information for each IAB donor CU in the list of IAB donor CUs; and
    after a handover of the IAB node to the target IAB donor CU, establishing the interface between the IAB node DU and the target IAB donor CU based on the obtained configuration information.

2. The method of claim 1, wherein obtaining configuration information comprises receiving the configuration information from a source IAB donor CU.

3. The method of claim 2, wherein receiving the configuration information from a source IAB donor CU comprises receiving a F1 message at the IAB node DU.

4. The method of claim 1, wherein obtaining configuration information comprises receiving a handover command that includes the configuration information.

5. A network node capable of operating as an integrated access and backhaul (IAB) node comprising a distributed unit (DU) and a mobile termination (MT), the network node comprising processing circuitry operable to:
    obtain configuration information for establishing an interface between the IAB node DU and a target IAB donor central unit (CU)), wherein the configuration information comprises a list of IAB donor CUs and associated configuration information for each IAB donor CU in the list of IAB donor CUs; and
    after a handover of the IAB node to the target IAB donor CU, establishing the interface between the IAB node DU and the target IAB donor CU based on the obtained configuration information.

6. The network node of claim 5, wherein the processing circuitry is operable to obtain configuration information by receiving the configuration information from a source IAB donor CU.

7. The network node of claim 5, wherein the processing circuitry is operable to obtain configuration information by receiving a handover command that includes the configuration information.

8. The network node of claim 5, wherein the processing circuitry is operable to establish the interface between the IAB node DU and the target IAB donor CU based on an indication from the target IAB donor CU.

* * * * *